United States Patent
Kim et al.

(10) Patent No.: US 10,346,486 B2
(45) Date of Patent: Jul. 9, 2019

(54) METHOD AND APPARATUS FOR PROVIDING INFORMATION ABOUT CONTENT

(71) Applicant: Samsung Electronics Co., Ltd., Suwon-si, Gyeonggi-do (KR)

(72) Inventors: Dong-jun Kim, Suwon-si (KR); Jung-ick Guack, Yongin-si (KR); Tae-wan Kim, Suwon-si (KR); Young-soo Choi, Seoul (KR); Do-won Hyun, Seoul (KR); Jong-soo Yoon, Seoul (KR); Jeong-yeon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 370 days.

(21) Appl. No.: 14/519,705

(22) Filed: Oct. 21, 2014

(65) Prior Publication Data

US 2015/0127675 A1  May 7, 2015

(30) Foreign Application Priority Data

Nov. 5, 2013  (KR) .......................... 10-2013-0133823

(51) Int. Cl.
  *G06F 16/00*   (2019.01)
  *G06F 16/9535*   (2019.01)
  (Continued)

(52) U.S. Cl.
  CPC ...... *G06F 16/9535* (2019.01); *H04M 1/7253* (2013.01); *H04N 21/4126* (2013.01);
  (Continued)

(58) Field of Classification Search
  CPC ......... G06F 17/30867; G06F 17/30672; G06F 16/9535; H04M 1/7253; H04M 1/72561;
  (Continued)

(56) References Cited

U.S. PATENT DOCUMENTS 6,476,825 B1 * 11/2002 Croy .................... H04N 5/4403
                                                    715/716
7,069,573 B1 *  6/2006 Brooks .............. H04N 7/17336
                                                    348/E7.073
(Continued)

FOREIGN PATENT DOCUMENTS

CN        1393107 A    1/2003
CN      101047816 A   10/2007
(Continued)

OTHER PUBLICATIONS

Chinese Office Action dated Oct. 16, 2018, issued in the Chinese Patent Application No. 201480060430.0.
(Continued)

*Primary Examiner* — Noosha Arjomandi
(74) *Attorney, Agent, or Firm* — Jefferson IP Law, LLP

(57) ABSTRACT

A display apparatus for and a method of providing to users additional information associated with a broadcasting signal that is being output via the display apparatus are provided. The display apparatus includes a communication unit configured to perform data communication, and a control unit configured to acquire a keyword from content being reproduced by the display apparatus, to acquire user preference information corresponding to a mobile terminal, to acquire a search result corresponding to the acquired keyword, to produce additional information based on the acquired search result and the acquired user preference information, and to provide the additional information to the mobile terminal via the communication unit.

16 Claims, 22 Drawing Sheets

(51) Int. Cl.
*H04N 21/422* (2011.01)
*H04N 21/4223* (2011.01)
*H04N 21/439* (2011.01)
*H04N 21/81* (2011.01)
*H04N 21/44* (2011.01)
*H04N 21/442* (2011.01)
*H04N 21/45* (2011.01)
*H04N 21/475* (2011.01)
*H04N 21/4782* (2011.01)
*H04N 21/488* (2011.01)
*H04N 21/41* (2011.01)
*H04M 1/725* (2006.01)

(52) U.S. Cl.
CPC ... *H04N 21/4223* (2013.01); *H04N 21/42203* (2013.01); *H04N 21/4394* (2013.01); *H04N 21/44008* (2013.01); *H04N 21/44222* (2013.01); *H04N 21/4532* (2013.01); *H04N 21/4755* (2013.01); *H04N 21/4782* (2013.01); *H04N 21/4882* (2013.01); *H04N 21/8133* (2013.01); *H04M 1/72561* (2013.01)

(58) Field of Classification Search
CPC ......... H04N 21/4126; H04N 21/42203; H04N 21/4223; H04N 21/44008; H04N 21/44222; H04N 21/4532; H04N 21/4755; H04N 21/4782; H04N 21/4882; H04N 21/8133
See application file for complete search history.

(56) References Cited

U.S. PATENT DOCUMENTS

| | | | |
|---|---|---|---|
| 8,473,985 B2 | 6/2013 | Hwang | |
| 8,634,818 B2 | 1/2014 | Lee et al. | |
| 2002/0038358 A1* | 3/2002 | Sweatt, III | H04H 60/72 |
| | | | 709/218 |
| 2002/0159522 A1* | 10/2002 | Chun | H04N 21/235 |
| | | | 375/240.03 |
| 2003/0088871 A1* | 5/2003 | Kimura | G06F 17/30053 |
| | | | 725/46 |
| 2003/0229900 A1* | 12/2003 | Reisman | G06F 17/30873 |
| | | | 725/87 |
| 2005/0232242 A1* | 10/2005 | Karaoguz | H04L 12/2805 |
| | | | 370/352 |
| 2006/0090183 A1* | 4/2006 | Zito | G06F 17/30035 |
| | | | 725/46 |
| 2007/0061198 A1* | 3/2007 | Ramer | G06Q 20/12 |
| | | | 705/14.53 |
| 2007/0192318 A1* | 8/2007 | Ramer | G06F 17/30867 |
| 2009/0063568 A1 | 3/2009 | Choe et al. | |
| 2009/0113469 A1* | 4/2009 | Jo | H04N 7/17318 |
| | | | 725/32 |
| 2009/0183202 A1 | 7/2009 | Yoon et al. | |
| 2010/0279667 A1 | 11/2010 | Wehrs et al. | |
| 2011/0321098 A1 | 12/2011 | Bangalore et al. | |
| 2012/0052847 A1* | 3/2012 | Lee | H04L 12/2809 |
| | | | 455/414.1 |
| 2012/0089584 A1 | 4/2012 | Yoon et al. | |
| 2013/0215145 A1 | 8/2013 | Song et al. | |
| 2014/0129942 A1* | 5/2014 | Rathod | H04N 21/44222 |
| | | | 715/720 |
| 2016/0357384 A1* | 12/2016 | Khalid | H04B 5/0037 |

FOREIGN PATENT DOCUMENTS

| | | |
|---|---|---|
| CN | 102377819 A | 3/2012 |
| CN | 102802029 A | 11/2012 |
| CN | 103260076 A | 8/2013 |
| EP | 2 017 751 A1 | 1/2009 |
| KR | 10-0926705 B1 | 11/2009 |
| KR | 10-0970711 B1 | 7/2010 |
| KR | 10-1092769 B1 | 12/2011 |
| WO | 02/11446 A2 | 2/2002 |
| WO | 2012/120108 A2 | 9/2012 |

OTHER PUBLICATIONS

Chinese Office Action dated Mar. 28, 2019, issued in Chinese Application No. 201480060430.0.

* cited by examiner

FIG. 17

| Search ID | 키워드 | Type | Data | Search time |
|---|---|---|---|---|
| id_S001 | Hyunjin RYU | image | image binary data | 2013.03.16 / 15:31:32 |
| id_S002 | Don't forget me_Suji_Kang Chi, the Beginning OST | sound | sound binary data | 2013.03.17 / 09:21:45 |

FIG. 18

| Search result ID | Search ID | Group | Title | Contents | Link |
|---|---|---|---|---|---|
| id_R001 | id_S001 | detailed information | Hyunjin RYU profile | Birth: March 25, 1987 (Age: 26), Incheon Metropolitan City Nationality: Republic of Korea, Blood type: A Team: LA Dodgers | http://ko.wikipedia.org/wiki/%EB%A5%98%ED%98%84%EC%A7%84 |
| id_R002 | id_S001 | news | Hyunjin RYU feeling burdened, Can he save Dodgers on 2-game losing streak ? | Korean monster Hyunjin RYU (26, LA Dodgers) has much heavier responsibility. He should save Dodgers suffering two straight defeats in the best-of-seven National League Championship Series (NLCS). | http://www.munhwa.com/news/view.html?no=20131013MW11522952641 |
| id_R003 | id_S001 | web document | Magic ball, LA Dodgers Hyunjin RYU card release ! | Hyunjin RYU of LA Dodgers has been realized in computer games for the first time in Korea. CJ E&M Netmarble (hereinafter, referred to as Netmarble; Section Representative Young-gi CHO; www.netmarble.net) has showed items, such as, LA Dodgers Hyunjin RYU entered into MLB, on online baseball games. | http://gametoc.hankyung.com/news/articleView.html?idxno=8538 |
| id_R004 | id_S001 | web document | Hyunjin RYU LA Dodgers jersey baseball bracelet | We put on game ! Cheer for Los Angeles Dodgers with Los Angeles Dodgers on your body and together with LA Dodgers. Create your style fashionably and sportly in daily lives | http://www.10x10.co.kr/shopping/category_prd.asp?itemid=874180 |
| id_R005 | id_S001 | web document | Hyunjin RYU saying "I will not lose points in the beginning, I'm willing to be a relief pitcher. | 12 hours ago - Hyunjin RYU says "I will not lose points in the beginning." (LA = Yonhap News) | http://www.yonhapnews.co.kr/.../1001000000AKR20131014012600075.HTML |
| id_R100 | id_S002 | detailed information | Don't forget me | Album Introduction: MBC Mon-Tues Mini Series "Kang Chi, the Beginning" OST Part. 5 "Don't forget me" – Suji (Miss A) | http://music.naver.com/album/index.nhn?albumId=377746&trackId=3796686 |
| id_R101 | id_S002 | web document | Suji (Miss A)_Don't forget me (Kang Chi, the Beginning OST) | 'Suji' acting as "Yeowool Dam" in the drama sang a theme song "Don't forget me" that expresses a fateful love. | http://tvcast.naver.com/v/52597 |
| id_R102 | id_S002 | web document | Suji is selected as a new face of the advertisement of "The Face Shop". A two-top system together with Seohyun starts. –SBS ESPN | The Face Shop anticipates that the fresh and healthy image of Suji will help to more increase the sales of a product that has been sold more than a hundred thousand since the release on early March. | http://sbsespn.sbs.co.kr/news/news_content.jsp?article_id=E10002835925# |

FIG. 19

| Additional information ID | Search ID | Search result ID | User ID | User preference | Title | Contents | Link |
|---|---|---|---|---|---|---|---|
| id_R001 | id_S001 | id_R003 | user1 | game | Magic ball, LA Dodgers Hyunjin RYU card release ! | Hyunjin RYU of LA Dodgers has been realized in computer games. CJ E&M Netmarble (hereinafter, Netmarble; Section Representative Young-gi CHOp, WWW.NETMARBLE.NET) has showed items, such as, LA Dodgers Hyunjin RYU entered into MLB, on online baseball games. | www.netmarble.net http://gametoc.hankyung.com/news/articleView.htm/?idxno=8538 |
| id_R002 | id_S001 | id_R004 | user2 | shopping | Hyunjin RYU LA Dodgers jersey baseball bracelet | We put on game ! Create your style fashionably and sportily in daily lives. | http://www.10x10.co.kr/shopping/category_prd.asp?itemid=874180 |

FIG. 20

| User ID | Preference rank | Final access information | Total number of accesses | Category | Keyword 1 | Keyword 2 | Keyword 3 | Keyword 4 |
|---|---|---|---|---|---|---|---|---|
| user 1 | 1 | date | 23 | game | sports game | mobile game | baseball | |
| user 1 | 2 | date | 11 | local information | popular restaurant | | | |
| user 2 | 1 | date | 66 | shopping | fashion accessories | bracelet | necklace | comestics |
| user 2 | 2 | date | 23 | entertainment | art | dance | | |

FIG. 21

| Category ID | Category name | Keyword |
|---|---|---|
| C01 | computer | software, OS, programming, multimedia, homepage building, Internet, security, virus, communication, etc. |
| C02 | game | role-playing, sports game, action, arcade, simulation, mobile game, board game, etc. |
| C03 | shopping | home appliances, mobile phone, cosmetics, beauty, clothes, fashion accessories, furniture, bedding, etc |
| C04 | entertainment | entertainer, broadcaster, video, DVD, TV, radio, music, art, dance, etc. |
| C05 | living | marriage, pregnancy, birth, infant care, education, etiquette, saving, etc. |
| C06 | sports | soccer, baseball, basketball, golf, volleyball, tennis, athletic sports, martial arts, etc. |
| C07 | education | school, entrance examination information, foreign language, study-abroad, language study abroad, engineering, arts or physical education, etc. |
| C08 | health | medical consultation, health, medicine, human body common sense, exercise, weight training, etc. |
| C09 | finance | real estate, stock, share, deposit, installment savings, insurance, investment techniques, etc. |
| C010 | Society | law, legal advice, religion, business, incorporation, social organization, service, etc. |
| C011 | traveling | overseas traveling, local traveling, visa issuing, passport, airline ticket, accommodation, etc. |
| C012 | local information | popular restaurant, traffic, etc. |

METHOD AND APPARATUS FOR PROVIDING INFORMATION ABOUT CONTENT

CROSS-REFERENCE TO RELATED APPLICATION(S)

This application claims the benefit under 35 U.S.C. § 119(a) of a Korean patent application filed on Nov. 5, 2013 in the Korean Intellectual Property Office and assigned Serial number 10-2013-0133823, the entire disclosure of which is hereby incorporated by reference.

TECHNICAL FIELD

The present disclosure relates to a display apparatus and a method of controlling the display apparatus. More particularly, the present disclosure relates to an apparatus and method of providing additional information associated with a broadcasting signal that is being output by a display.

BACKGROUND

To satisfy various demands of users, apparatuses for performing various functions, such as an Internet communication apparatus, a camera, a microphone, and a processor, may be included in a display apparatus. For example, display apparatuses, such as televisions (TVs) or digital multimedia broadcasting (DMB) receivers, may perform not only an intrinsic function of outputting a broadcast but also other functions such as performing Internet access.

In the related art, users may receive additional information from display apparatuses by using such various functions. However, in the related art, users are inconvenienced by having to input a keyword and find a desired result from among results of the keyword input. In other words, users are inconvenienced by having to choose a keyword and perform a search via the keyword in order to obtain additional information associated with a broadcast that is being output by a display apparatus.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method of providing to users additional information associated with a broadcasting signal that is being outputted via a display apparatus, without requiring users to input keywords and view search results based on the keywords.

Additional aspects will be set forth in part in the description which follows and, in part, will be apparent from the description, or may be learned by practice of the presented embodiments.

In accordance with another aspect of the present disclosure, a method of providing additional information associated with content is performed by a display apparatus is provided. The method includes acquiring user preference information corresponding to a mobile terminal, acquiring a keyword from the content that is being reproduced by the display apparatus, acquiring a search result corresponding to the acquired keyword, producing additional information based on the acquired search result and the acquired user preference information, and providing the additional information to the mobile terminal.

In accordance with another aspect of the present disclosure, a method of outputting additional information associated with content is performed by a mobile terminal is provided. The method includes providing user preference information to a display apparatus, accessing the display apparatus, receiving, from the display apparatus, additional information that is produced based on the provided user preference information and a search result corresponding to a keyword acquired from the content being reproduced by the display apparatus, and outputting the received additional information by using an application installed in the display apparatus.

In accordance with another aspect of the present disclosure, a display apparatus is provided. The display apparatus includes a communication unit configured to perform data communication and a control unit configured to acquire a keyword from content being reproduced by the display apparatus, to acquire user preference information corresponding to a mobile terminal, to acquire a search result corresponding to the acquired keyword, to produce additional information based on the acquired search result and the acquired user preference information, and to provide the additional information to the mobile terminal via the communication unit.

In accordance with another aspect of the present disclosure, a mobile terminal is provided. The mobile terminal includes a communication unit configured to transmit user preference information to a display apparatus and to receive, from the display apparatus, additional information that is produced based on a search result corresponding to a keyword acquired from content being reproduced by the display apparatus and the user preference information, a display unit configured to output an image, and a control unit configured to control the display unit to output the received additional information by using an application installed in the display apparatus.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 17 is a table showing information about keywords stored in a display apparatus according to an embodiment of the present disclosure;

FIG. 18 is a table showing information included in search results according to an embodiment of the present disclosure;

FIG. 19 is a table showing additional information produced according to an embodiment of the present disclosure;

FIG. 20 is a table showing user preference information according to an embodiment of the present disclosure;

FIG. 21 is a table showing keywords classified by categories according to an embodiment of the present disclosure;

Throughout the drawings, it should be noted that like reference numbers are used to depict the same or similar elements, features, and structures.

DETAILED DESCRIPTION

Figure 1:
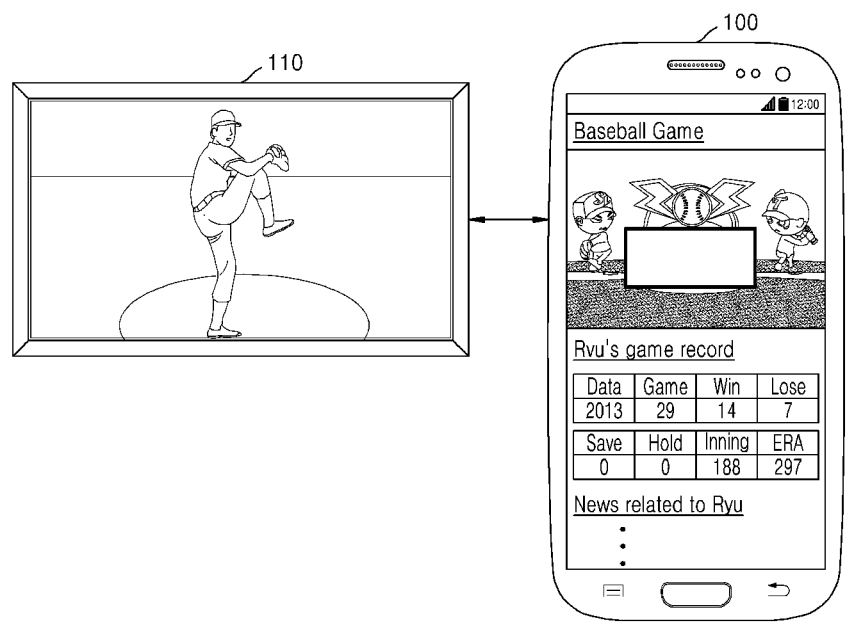
FIG. 1 is a conceptual diagram illustrating a display apparatus and a mobile terminal that provide additional information according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments of the present disclosure are described in detail herein with reference to the accompanying drawings so that this disclosure may be easily performed by one of ordinary skill in the art to which the present disclosure pertain. The present disclosure may, however, be embodied in many different forms and should not be construed as being limited to the embodiments set forth herein. In the drawings, parts irrelevant to the description are omitted for simplicity of explanation, and like numbers refer to like elements throughout.

Throughout the specification, when an element is referred to as being "connected" or "coupled" to another element, the element may be directly connected or coupled to the other element, or may be electrically connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements.

Throughout the specification, for convenience of explanation, various types of content that may be reproduced by a display apparatus are referred to as a broadcasting signal. For example, a broadcasting signal mentioned in the present specification may be replaced with Video On Demand (VOD), sound source data, video data, and/or still image data, which is being played back by a display apparatus.

Throughout the specification, for convenience of explanation, a web document is referred to as an example of a search result. However, embodiments of the present disclosure are not limited thereto.

The present disclosure will now be described more fully with reference to the accompanying drawings, in which various embodiments of the disclosure are shown.

FIG. 1 is a conceptual diagram illustrating a display apparatus and a mobile terminal that provide additional information according to an embodiment of the present disclosure.

Referring to FIG. 1, a display apparatus 110 may receive a broadcasting signal via a television (TV) network, a cable, a video apparatus, data communication, and the like. The display apparatus 110 may output the received broadcasting signal. The broadcasting signal received by the display apparatus 110 may include video information, audio information, and other information associated with the broadcasting signal. The other information associated with the broadcasting signal may include metadata (e.g., an electronic program guide (EPG)), advertisement information, and the like.

Since the display apparatus 110 is an apparatus capable of receiving and outputting a broadcasting signal, the display apparatus 110 may be any of various apparatuses such as a TV, a digital multimedia broadcasting (DMB) receiver, a tablet personal computer (PC), a desktop computer, and a combination thereof. However, embodiments of the present disclosure are not limited thereto.

The display apparatus 110 may provide, to a mobile terminal 100, additional information about the broadcasting signal that is being outputted to the display apparatus 110. The mobile terminal 100 that has received the additional information from the display apparatus 110 may output the additional information via a browser installed therein. However, embodiments of the present disclosure are not limited thereto, and the mobile terminal 100 may output the additional information via an application, a client program, and the like installed therein. The additional information may include a variety of information found based on the broadcasting signal. In other words, the additional information may include a web document, a link, and the like that has been found based on the broadcasting signal. However, embodiments of the present disclosure are not limited thereto.

For example, when the display apparatus 110 reproduces a baseball broadcast, the display apparatus 110 may provide a baseball-related game link, game statistics of a baseball player associated with the baseball broadcast, and news related to the baseball player, to the mobile terminal 100.

The mobile terminal 100 is a terminal that enables data communication and is of a portable size. The mobile terminal 100 may be any of various types of devices, such as a smartphone, a tablet PC, a desktop computer, a laptop computer, and a combination thereof. However, embodiments of the present disclosure are not limited thereto.

Figure 2:
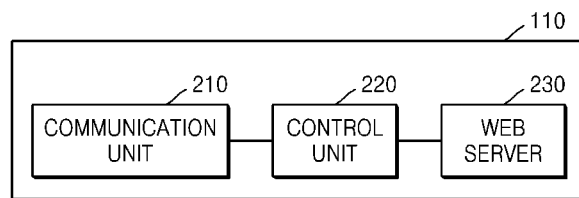
FIG. 2 is a block diagram illustrating a structure of a display apparatus of FIG. 1 according to an embodiment of the present disclosure.

FIG. 2 is a block diagram illustrating a structure of the display apparatus 110 of FIG. 1 according to an embodiment of the present disclosure.

Referring to FIG. 2, the display apparatus 110 may include a communication unit 210 for signal transmission and reception with a component of the display apparatus 110 or an external apparatus of the display apparatus 110, a control unit 220 for controlling each element of the display apparatus 110, and a web server 230 that provides additional information to the mobile terminal 100 of FIG. 1. The structure of the display apparatus 110 illustrated in FIG. 2 is only an embodiment, and thus embodiments of the present disclosure are not limited to the structure. In some embodiments, the display apparatus 110 may include more or less elements than those illustrated in FIG. 2. Although the control unit 220 and the web server 230 are separate from each other in FIG. 2, the control unit 220 may include the web server 230 or perform a function of the web server 230. In other words, the web server 230 may not necessarily exist as a separate element.

The communication unit 210 includes a device for performing communication between elements of the display apparatus 110 and communication between the display apparatus 110 and the outside of the display apparatus 110. The communication unit 210 may receive a broadcasting signal via a public TV network, a cable, a video apparatus, data communication using an Internet network, and the like.

The control unit 220 may control each element of the display apparatus 110 and may acquire keywords from the broadcasting signal received via the communication unit 210. The keywords are words, symbols, or the like that are used to search for data. The broadcasting signal received by the communication unit 210 may include a video signal, an audio signal, and metadata associated with a broadcasting program, which are output by the display apparatus 110. For example, when the display apparatus 110 is a digital TV, information, such as an image, an audio signal, and a program title of a baseball broadcast that a user is watching via the digital TV, may be included in the broadcasting signal.

According to an embodiment, the control unit 220 may acquire a keyword by performing image recognition of video information included in the broadcasting signal at regular intervals. For example, when a drama is being played on the TV, a control unit included in the TV may acquire, as a keyword, a name of an actor or an actress acting in the drama, a name of a filming location of the drama, and the like via image recognition with respect to an image being reproduced by the TV.

According to another embodiment, the control unit 220 may acquire keywords by performing speech recognition of audio information included in the broadcasting signal. For example, when the volume of an audio signal included in the audio information is equal to or higher than a predetermined value, the control unit 220 may acquire a keyword from text into which the audio signal is converted via voice recognition. As another example, if audio information matched with a sound source is output via the display apparatus 110, the name of the sound source may be acquired as a keyword.

According to another embodiment, the control unit 220 may acquire a keyword from the metadata included in the broadcasting signal. For example, the control unit 220 may acquire, as a keyword, a program title and the like included in an EPG included in the broadcasting signal. As another example, when a content provider transmits a broadcasting signal including advertisement information and the like about pizza to the display apparatus 110, the control unit 220 may acquire a keyword related to pizza from the advertisement information.

According to another embodiment, the control unit 220 may not directly process the broadcasting signal, but may transmit the broadcasting signal to an external server located outside of the display apparatus 110 and may receive a keyword produced by the external server.

The above-described keyword acquisition methods are only examples, and thus embodiments of the present disclosure are not limited thereto.

The control unit 220 may acquire user preference information corresponding to the mobile terminal 100 of FIG. 1. The user preference information is information used by a user of the mobile terminal 100 to select information that the user prefers. The user preference information may be a category of the information that the user prefers, and/or a keyword used to search for the information that the user prefers. The user preference information may vary depending on embodiments.

According to an embodiment, the user preference information may be input to the display apparatus 110 by the user, and the input user preference information may be stored in a storage unit (not shown) of the display apparatus 110. The display apparatus 110 may receive feedback information via the communication unit 210 and update the user preference information based on the received feedback information. For example, when the display apparatus 110 provides, as additional information, a webpage including a link for accessing a game and news information to the mobile terminal 100 of FIG. 1 and a user of the mobile terminal 100 of FIG. 1 selects the link for accessing the game via the mobile terminal 100, the display apparatus 110 may receive feedback information indicating that a link related to a game-related category has been selected and thus may update the user preference information to indicate that the user's preference for the game-related category is high.

According to an embodiment, the display apparatus 110 may acquire and/or update the user preference information, based on information received from the mobile terminal 100 of FIG. 1. The information received from the mobile terminal 100 may include information about a user's scheduled appointment input to the mobile terminal 100 or information about a search keyword input to a web browser of the mobile terminal 100. However, embodiments of the present disclosure are not limited thereto. For example, when a scheduled appointment such as a mountain climbing, soccer, and/or a baseball has been input to the mobile terminal 100 by the user, the display apparatus 110 may determine that the user's preference for sports is high.

According to an embodiment, the display apparatus 110 may acquire and/or update the user preference information, based on the history of broadcasts that a user has watched via the display apparatus 110. For example, if a user purchases clothes while watching a shopping broadcast, the display apparatus 110 may determine that user's preference for a fashion-related category is high. Alternatively, the display apparatus 110 may compile statistics on broadcasting programs that the user watches, and may determine that user's preference for a frequently watched program is high.

According to an embodiment, the display apparatus 110 may acquire and/or update the user preference information, based on an image captured using a camera (not shown) included in the display apparatus 110. The display apparatus 110 may capture an image of a user who is watching a broadcast played on the display apparatus 110 by using the camera, and the control unit 220 may perform image recognition on the captured image. The control unit 220 may acquire user preference information for a currently-reproduced broadcasting program, according to a result of the image recognition. In other words, the control unit 220 may identify the user by recognizing the face of the user included in the image, and may analyze a facial expression of the user. If the user is smiling, the control unit 220 may determine that user's preference for the currently-reproduced broadcasting program is high.

According to an embodiment, the display apparatus 110 may acquire and/or update the user preference information, based on audio information acquired by a microphone (not shown). The display apparatus 110 may acquire the audio information via a microphone (not shown) included in the display apparatus 110, or may acquire audio information obtained by a microphone included in a mobile 100 terminal from the mobile terminal 100. When a predetermined word included in the audio information is found via speech recognition with respect to the audio information, the control unit 220 may determine that user's preference for the word is high.

According to an embodiment, the display apparatus 110 may receive user preference information corresponding to a mobile terminal 100 from a cloud server (not shown).

According to an embodiment, a user may input the user preference information to the display apparatus 110 of FIG. 1 via the mobile terminal 100 of FIG. 1.

The web server 230 is a server that provides a web page. When the mobile terminal 100 of FIG. 1 connects to the web server 230, the web server 230 may provide a web page including additional information to the mobile terminal 100 of FIG. 1. According to an embodiment, the web server 230 may collect web documents, based on keywords acquired by the control unit 220. The web server 230 may collect and process web documents found based on the keywords. The collection and processing of the web documents by the web server 230 may include web crawling in which collected web documents are included in an index of a search target. For example, the web server 230 may collect web documents, such as a baseball game link, the game statistics of a baseball player, and news about the baseball player, as in FIG. 1 and process the collected web documents such that the collected web documents may be displayed on a single page as shown on the screen of the mobile terminal 100 of FIG. 1. In other words, the web server 230 may collect and process web documents and thus produce additional information based on the processed web documents.

The web server 230 may select additional information according to the user preference information acquired by the control unit 220 from among collected pieces of additional information, and provide the selected additional information to the mobile terminal 100 of FIG. 1. According to an embodiment, the web server 230 may search again for additional information from among pieces of additional information found based on the keyword acquired by the control unit 220, based on the user preference information. For example, when baseball and soccer are acquired as keywords by the control unit 220, the web server 230 may search for and collect baseball-related additional information and soccer-related additional information. When baseball and basketball are included in the user preference information acquired by the control unit 220, the web server 230 may select baseball-related additional information from among the collected pieces of additional information and may transmit the selected baseball-related additional information to the mobile terminal 100 of FIG. 1. In other words, the additional information selected according to the user preference information from among pieces of additional information produced based on the web documents collected by using the keywords may be provided to the mobile terminal 100 of FIG. 1 via the communication unit 210. As another example, the display apparatus 110 may receive location information of the mobile terminal 100 from the mobile terminal 100, select additional information associated with the location information of the mobile terminal 100 from among the pieces of additional information, and provide the selected additional information to the mobile terminal 100.

According to another embodiment, the web server 230 may first match the keywords with the user preference information and then may search for and collect pieces of additional information based on matches between the keywords and the user preference information. For example, when the display apparatus 110 plays back a drama and fashion is included in the user preference information, the display apparatus 110 may provide additional information about the fashion of an actor acting in the drama to the mobile terminal 100 of FIG. 1. As another example, when the display apparatus 110 plays back a soccer broadcast and fashion is included in the user preference information, information about the fashion of a soccer player may be searched for so that the display apparatus 10 may provide the same as the additional information.

Figure 3:
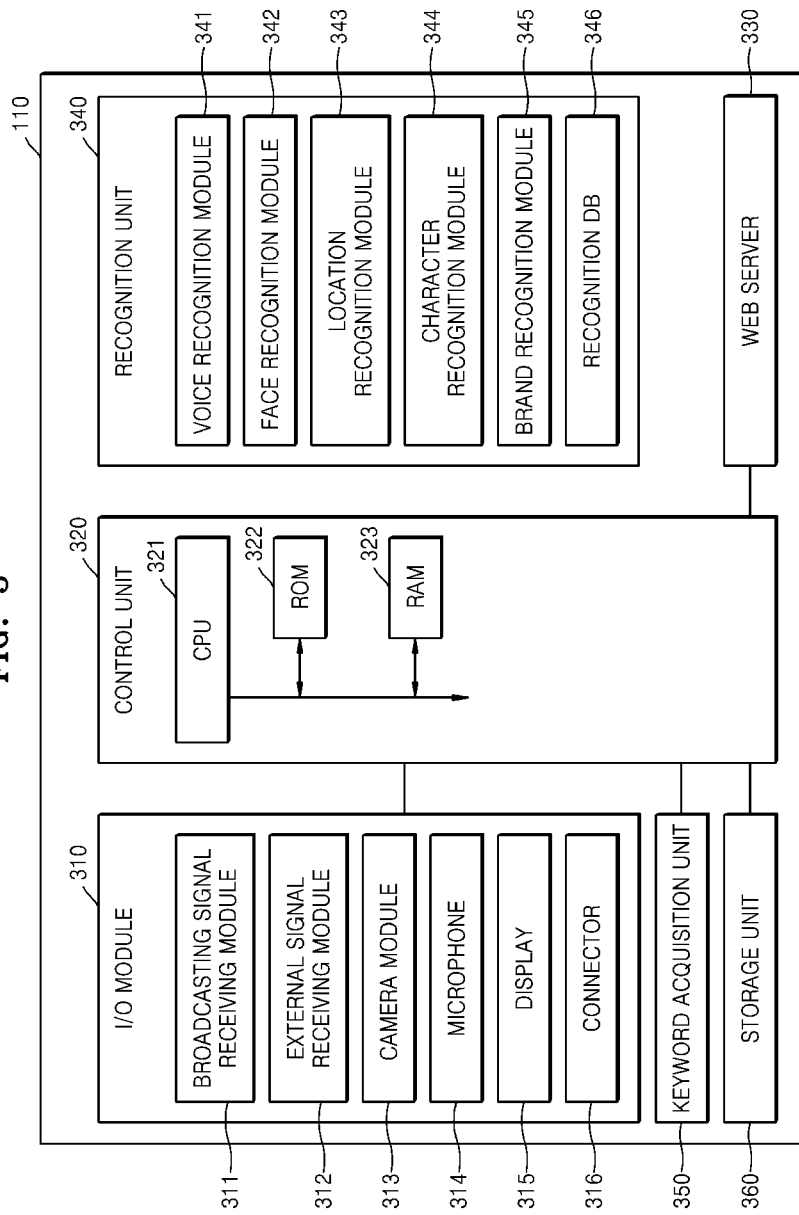
FIG. 3 is a block diagram illustrating a structure of the display apparatus of FIG. 1 in greater detail according to an embodiment of the present disclosure.

FIG. 3 is a block diagram illustrating a structure of the display apparatus of FIG. 1 in greater detail according to an embodiment of the present disclosure.

Referring to FIG. 3, the display apparatus 110 may include an input/output (I/O) module 310, a control unit 320, a recognition unit 340, a keyword acquisition unit 350, a storage unit 360, and a web server 330.

The I/O module 310 may be included in the communication unit 210 of FIG. 2. The I/O module 310 may transmit and/or receive a signal by using a communication device or may perform an input and/or an output by using an I/O device. The I/O module 310 may include a broadcasting signal receiving module 311, which receives a broadcasting signal, an external signal receiving module 312, which receives a data signal from an external device (not shown), a camera module 313, which acquires an image by using a camera, a microphone 314, which acquires an audio signal, a display 315, which outputs an image, and a connector 316, via which the display apparatus 110 is connected to the external device.

The control unit 320 may include a central processing unit (CPU) 321, read-only memory (ROM) 322 that stores a control program for controlling the display apparatus 110, and random-access memory (RAM) 323 that stores a signal and/or data input by an external source of the display apparatus 110 and/or is used as a memory area for operations performed by the display apparatus 110. The CPU 321 may include a single core processor, a dual core processor, a triple core processor, or a quad core processor. The CPU 321, the ROM 322, and the RAM 323 may be connected to each other via an internal BUS.

The control unit 320 may recognize a voice, a face, a location, global positioning system (GPS) information, a character, a brand, and the like included in the broadcasting signal by using the recognition unit 340, and may extract a result of the recognition in the form of text. A voice recognition module 341 may recognize voice information included in the received broadcasting signal and compare the recognized voice information with data stored in recognition DB 346 to thereby determine a text corresponding to the recognized voice information. A face recognition module 342 may recognize a face from video data included in the received broadcasting signal and compare the recognized face with data stored in the recognition DB 346 to thereby determine a name corresponding to the recognized face. A location recognition module 343 may recognize a building, a background image, and the like from the video data included in the received broadcasting signal and compare the recognized building, background image, and the like with data stored in the recognition DB 346 to thereby determine a name of a place, such as an administrative district, corresponding to the recognized building, background image, and the like. A character recognition module 344 may recognize a character from the video data included in the received broadcasting signal and compare the recognized character with data stored in the recognition DB 346 to thereby determine text included in the video data and corresponding to the recognized character. A brand recognition module 345 may recognize a brand from the video data included in the received broadcasting signal and compare the recognized brand with data stored in the recognition DB 346 to thereby determine a name of a product, a category to which the product belongs, or the like corresponding to the recognized brand.

The control unit 320 may control the keyword acquisition unit 350 to acquire a keyword suitable as a keyword from text determined by the recognition unit 340. The text determined by the recognition unit 340 may be text that is not suitable for an additional information search. Accordingly, the control unit 320 may compare the text with a word DB (not shown) for determining a keyword, and may select a suitable keyword according to a result of the comparison.

The web server 330 may perform a search based on the keyword acquired by the keyword acquisition unit 350 and process a result of the search to produce additional information by the control unit 320. The storage unit 360 may store user preference information corresponding to the mobile terminal 100 of FIG. 1. When the mobile terminal 100 of FIG. 1 accesses the web server 330 by using a browser, the web server 330 may provide, to the mobile terminal 100, additional information selected from among produced pieces of additional information according to the user preference information corresponding to the mobile terminal 100.

The web server 330 may receive feedback information from the mobile terminal 100 of FIG. 1 that has received the additional information. The feedback information is information about an input of a user which is inputted in response to the additional information displayed on the mobile terminal 100. The control unit 320 may update the user preference information stored in the storage unit 360, based on the received feedback information.

Figure 4:
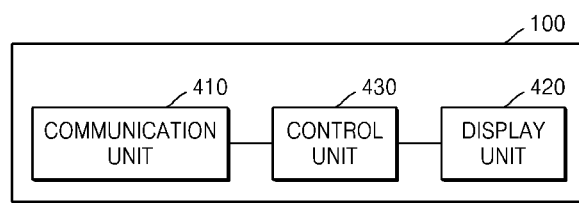
FIG. 4 is a block diagram illustrating a structure of a mobile terminal of FIG. 1 according to an embodiment of the present disclosure.

FIG. 4 is a block diagram illustrating a structure of a mobile terminal of FIG. 1 according to an embodiment of the present disclosure.

Referring to FIG. 4, the mobile terminal 100 may include a communication unit 410, a control unit 430, and a display unit 420. The structure of the mobile terminal 100 illustrated in FIG. 4 is only an embodiment, and thus embodiments of the present disclosure are not limited to the structure. In some cases, the mobile terminal 100 may include more or less elements than those illustrated in FIG. 4.

The communication unit 410 may perform communication between the internal elements of the mobile terminal 100 and/or communication between the mobile terminal 100 and an external device (not shown). The communication unit 410 may transmit the user preference information corresponding to the mobile terminal 100 to the display apparatus 110 of FIG. 1. The user preference information includes a variety of information based on which a user preference may be determined. For example, the mobile terminal 100 may transmit information about a category of interest of a user input to the mobile terminal 100, information about a schedule input to the mobile terminal 100, and/or location information of the mobile terminal 100 to the display apparatus 110 via the communication unit 410.

The communication unit 410 may access the web server 230 included in the display apparatus 110 and may receive, from the web server 230, additional information selected based on the user preference information from among pieces of additional information that are produced based on the broadcasting signal output to the display apparatus 110.

The display unit 420 may output an image. The display unit 420 may be any of various displays, such as, a Liquid Crystal Display (LCD) panel, a Plasma Display Panel (PDP), a Flexible Display, or a Transparent Display. Alternatively, the display unit 420 may be a touch screen into which a touch sensor, which is an input device, is combined.

The control unit 430 may drive an application installed in the mobile terminal 100. The control unit 430 may drive a browser installed in the mobile terminal 100 and may control the display unit 420 to output the additional information received from the display apparatus 110 via the browser.

Figure 5:
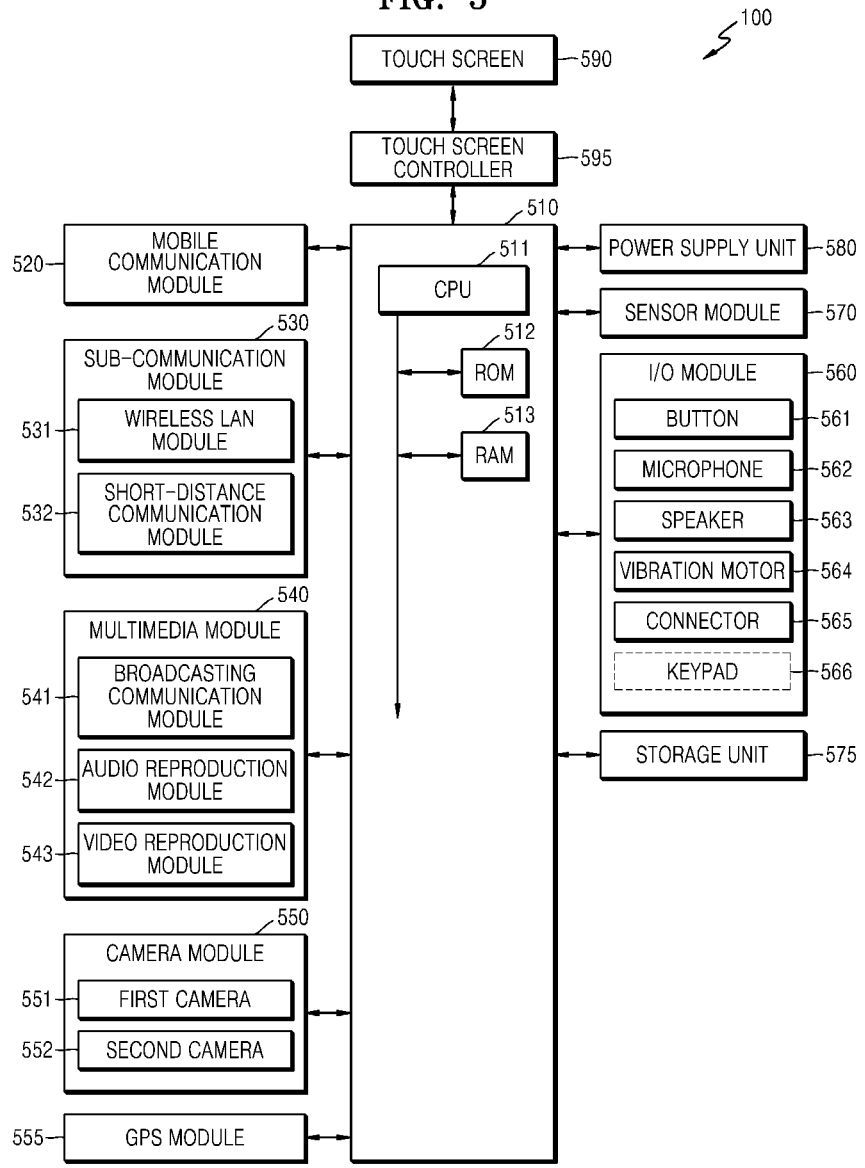
FIG. 5 is a block diagram illustrating a detailed structure of a mobile terminal of FIG. 1 in greater detail according to an embodiment of the present disclosure.

FIG. 5 is a block diagram illustrating a structure of a mobile terminal in greater detail according to an embodiment of the present disclosure. FIG. 5 only illustrates a mobile terminal according to an embodiment, and the mobile terminal according to one or more embodiments of the present disclosure may be embodied with more or less elements than those shown in FIG. 5.

Referring to FIG. 5, the mobile terminal 100 may be connected to an external apparatus (not shown), by using a mobile communication module 520, a sub-communication module 530, and a connector 565. The external apparatus may include at least one of another apparatus (not shown), a mobile phone (not shown), a smartphone (not shown), a tablet PC (not shown), and a server (not shown).

The mobile terminal 100 includes a touch screen 590 and a touch screen controller 595. The mobile terminal 100 further includes a control unit 510, the mobile communication module 520, the sub-communication module 530, a multimedia module 540, a camera module 550, a GPS module 555, an input/output (I/O) module 560, a sensor module 570, a storage unit 575, and a power supply unit 580. The sub-communication module 530 may include at least one of a wireless local area network (LAN) module 531 and a short-distance communication module 532. The multimedia module 540 may include at least one of a broadcasting communication module 541, an audio reproduction module 542, and a video reproduction module 543. The camera module 550 may include at least one of a first camera 551 and a second camera 552. The I/O module 560 may include at least one of a button 561, a microphone 562, a speaker 563, a vibration motor 564, the connector 565, and a keypad 566.

The control unit 510 may include a CPU 511, ROM 512 that stores a control program for controlling the mobile terminal 100, and RAM 513 that stores a signal or data input by an external source of the mobile terminal 100 and/or is used as a memory area for operations performed by the mobile terminal 100. The CPU 511 may include a single core processor, a dual core processor, a triple core processor, or a quad core processor. The CPU 511, the ROM 512, and the RAM 513 may be connected to each other via an internal BUS.

The control unit 510 may control the mobile communication module 520, the sub-communication module 530, the multimedia module 540, the camera module 550, the GPS module 555, the I/O module 560, the sensor module 570, the storage unit 575, the power supply unit 580, a touch screen 590, and a touch screen controller 595. The mobile communication module 520, the sub-communication module 530, the multimedia module 540 may be included in the communication unit 410 of FIG. 4.

The mobile communication module 520 may allow the mobile terminals 100 to be connected to the external apparatus via mobile communication by using one or more antennas (not shown), under the control of the control unit 510. The mobile communication module 520 may transmit and/or receive a wireless signal for making a voice call or a video call or transmitting a short message service (SMS) or a multimedia message (MMS) to a mobile phone (not shown), a smartphone (not shown), a tablet PC (not shown), or another apparatus (not shown), which has a phone number input to the mobile terminal 100.

The sub-communication module 530 may include at least one of the wireless LAN module 531 and the short-distance communication module 532. For example, the sub-communication module 530 may include the wireless LAN module 531 or the short-distance communication module 532, or may include both the wireless LAN module 531 and the short-distance communication module 532.

The wireless LAN module 531 may access the Internet under the control of the control unit 510, via a wireless access point (AP) (not shown). The wireless LAN module 531 may support the wireless LAN standard IEEE802.11x of the Institute of Electrical and Electronics Engineers (IEEE). The short-distance communication module 532 may wirelessly perform short-distance communication between the mobile terminal 100 and an image forming apparatus (not shown), in response to a control by the control unit 510. Examples of the short-distance communication may include Bluetooth, infrared data association (IrDA), ZigBee, etc.

The mobile terminal 100 according to its performance may include at least one of the mobile communication module 520, the wireless LAN module 531, and the short-distance communication module 532.

The multimedia module 540 may include the broadcasting communication module 541, the audio reproduction module 542, or the video reproduction module 543. The broadcasting communication module 541 may receive, in response to a control by the control unit 510, a broadcasting signal (e.g., a TV broadcasting signal, a radio broadcasting signal, or a data broadcasting signal) and broadcasting additional information (e.g., an EPG or an ESG) that are transmitted from a broadcasting station via a broadcasting antenna (not shown). The audio reproduction module 542 may reproduce a digital audio file that is stored or received in response to a control by the control unit 510. The video reproduction module 543 may reproduce a digital video file that is stored or received in response to a control by the control unit 510. The video reproduction module 543 may reproduce a digital audio file.

The multimedia module 540 may not include the broadcasting communication module 541 and may only include the audio reproduction module 542 and the video reproduction module 543. The audio reproduction module 542 or the video reproduction module 543 of the multimedia module 540 may be included in the control unit 510.

The camera module 550 may include at least one of the first camera 551 and the second camera 552 that captures a still image and/or films a video in response to a control by the control unit 510. The first camera 551 and/or the second camera 552 may include an auxiliary light source (not shown) for providing an amount of light which is required for the capturing or filming operation. The first camera 551 may be disposed at a front surface of the mobile terminal 100, and the second camera 552 may be disposed at a rear surface of the mobile terminal 100. Alternatively, the first camera 551 and the second camera 552 may be disposed adjacent to each other (e.g., a gap between the first camera 551 and the second camera 552 may be greater than 1 cm and less than 8 cm), and thus may capture a three-dimensional (3D) still image or may film a 3D video.

The GPS module 555 may receive signals from a plurality of GPS satellites (not shown) on orbits of the earth and may calculate a location of the mobile terminal 100 by using times of arrival of the signals from the GPS satellites to the mobile terminal 100.

The I/O module 560 may include at least one of the button 561, the microphone 562, the speaker 563, the vibration motor 564, the connector 565, and the keypad 566.

The button 561 may be formed at a front surface, a side surface, or a rear surface of a housing of the mobile terminal 100, and may include at least one of a power/lock button (not shown), a volume button (not shown), a menu button, a home button, a back button, and a search button.

The microphone 562 may receive a voice or a sound and thus may generate an electrical signal in response to a control by the control unit 510.

The speaker 563 may output, in response to a control by the control unit 510, sounds that correspond to various signals from the mobile communication module 520, the sub-communication module 530, the multimedia module 540, and/or the camera module 550 to an external source of the mobile terminal 100. The speaker 563 may output a sound that corresponds to a function performed by the mobile terminal 100. One or more speakers 563 may be formed at an appropriate location or appropriate locations of the housing of the mobile terminal 100.

The vibration motor 564 may convert an electrical signal into a mechanical signal, in response to a control by the control unit 510. For example, in a case where the mobile terminal 100 in a vibration mode receives a voice call from another apparatus (not shown), the vibration motor 564 may operate. The vibration motor 564 may operate in response to a touch motion by a user who contacts the touch screen 590 and sequential movements of a touch input on the touch screen 590.

The connector 565 may be used as an interface for connecting the mobile terminal 100 and another apparatus (not shown) or a power source (not shown). In response to a control by the control unit 510, the mobile terminal 100 may transmit data stored in the storage unit 575 of the mobile terminal 100 to another apparatus (not shown) or may receive data from the other apparatus, via a cable connected to the connector 565. A power may be supplied from the power source to the mobile terminal 100 or a battery (not shown) may be charged, via the cable connected to the connector 565.

The keypad 566 may receive a key input by the user so as to control the mobile terminal 100. The keypad 566 includes a physical keypad (not shown) formed at the mobile terminal 100 or a virtual keypad (not shown) displayed on the touch screen 590. The physical keypad formed at the mobile terminal 100 may be excluded depending on a performance or a structure of the mobile terminal 100.

The sensor module 570 includes one or more sensors that detect a status of the mobile terminal 100. For example, the sensor module 570 may include at least one selected from a proximity sensor (not shown) for detecting whether a user accesses the mobile terminal 100, an illumination sensor (not shown) for detecting an amount of light around the mobile terminal 100, and a motion sensor (not shown) for detecting motions of the mobile terminal 100 (e.g., rotation of the mobile terminal 100, acceleration or vibration applied to the mobile terminal 100, etc.). One or more sensors may be added or excluded depending on a performance of the mobile terminal 100.

The storage unit 575 may store, in response to a control by the control unit 510, signals or a plurality of pieces of data that are input or output in correspondence to operations of the mobile communication module 520, the sub-communication module 530, the multimedia module 540, the camera module 550, the GPS module 555, the I/O module 560, the sensor module 570, and the touch screen 590. The storage unit 575 may store a control program and applications for controlling the mobile terminal 100 or the control unit 510.

The term "storage unit" may include the storage unit 575, the ROM 512 and/or the RAM 513 in the control unit 510, or a memory card (not shown) mounted in the mobile terminal 100. The storage unit 575 may include a non-volatile memory, a volatile memory, a hard disk drive (HDD), or a solid state drive (SSD).

The power supply unit 580 may supply, in response to a control by the control unit 510, power to at least one battery (not shown) that is disposed in the housing of the mobile terminal 100. Also, the power supply unit 580 may supply power received from an external power source (not shown) to each of the aforementioned units of the mobile terminal 100 via the cable connected to the connector 565.

The display unit 420 of FIG. 4 may be formed of the touch screen 590. The touch screen 590 may output a UI that corresponds to various services, to the user. The touch screen 590 may transmit, to the touch screen controller 595, an analog signal that corresponds to at least one touch input to the UI. The touch screen 590 may receive the at least one touch input via a body part (e.g., a finger) of the user or a touchable input unit (e.g., a stylus pen). The touch screen 190 may also receive sequential movements of the at least one touch input. The touch screen 590 may transmit, to the touch screen controller 595, an analog signal that corresponds to the sequential movements of the at least one touch input.

Throughout the specification, the term 'touch input' is not limited to an input by a contact between the touch screen 590 and the body part of the user or the touchable input unit and may include a contactless input (e.g., when a gap between the touch screen 590 and the body part is equal to or less than 1 mm). A gap that is detectable by the touch screen 590 may be changed depending on a performance and/or a structure of the mobile terminal 100.

The touch screen 590 may be formed as a resistive touch screen, a capacitive touch screen, an infrared touch screen, or an ultrasound wave touch screen.

The touch screen controller 595 may convert the analog signal, which is received from the touch screen 590, into a digital signal (e.g., X and Y coordinates) and may transmit the digital signal to the control unit 510. The control unit 510 may control the touch screen 590 by using the digital signal transmitted from the touch screen controller 595. For example, the control unit 510, in response to the touch input, may select an application execution icon (not shown) displayed on the touch screen 590 or may execute an application. The touch screen controller 595 may be included in the touch screen 590 or the control unit 510.

Figure 6:
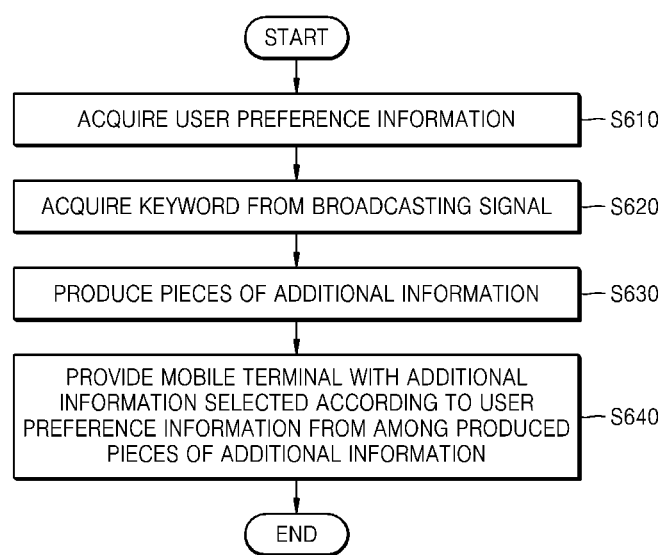
FIG. 6 is a flow chart of a process in which a display apparatus provides additional information to a mobile terminal according to an embodiment of the present disclosure.

FIG. 6 is a flow chart of a process in which a display apparatus provides additional information to a mobile terminal according to an embodiment of the present disclosure.

Referring to FIG. 6, the display apparatus 110 may perform operation S610 of acquiring user preference information corresponding to the mobile terminal 100, operation S620 of acquiring a keyword from a broadcasting signal being reproduced by the display apparatus 110, operation S630 of collecting web documents by using the acquired keyword and producing pieces of additional information based on the collected documents, by using the web server 330 included in the display apparatus 110, and operation S640 of providing the mobile terminal 100 with additional information selected according to the user preference information from among the produced pieces of additional information.

According to an embodiment, in operation S610, the display apparatus 110 may acquire user preference information stored in a storage unit of the display apparatus 110 from the storage unit. In this case, the display apparatus 110 may receive feedback information associated with additional information provided to the mobile terminal 100 in operation S640, from the mobile terminal 100. In response to the feedback information, the display apparatus 110 may update the user preference information stored in the storage unit.

According to another embodiment, in operation S610, the display apparatus 110 may receive schedule information input to the mobile terminal 100 from the mobile terminal 100 and may acquire user preference information based on the received schedule information.

According to another embodiment, in operation S610, the display apparatus 110 may receive information about a search keyword input to the mobile terminal 100 from the mobile terminal 100 and may acquire user preference information from the received search keyword. For example, the display apparatus 110 may receive a list of search keywords input to the mobile terminal 100, and when the mobile terminal 100 performs a search by using a keyword "restaurant" more than 10 times in a week, the display apparatus 110 may acquire the keyword "restaurant" as the user preference information.

According to another embodiment, in operation S610, the display apparatus 110 may receive the user preference information corresponding to the mobile terminal 100 from an external server such as a cloud server to acquire the user preference information.

According to another embodiment, in operation S610, the display apparatus 110 may acquire user preference information based on information that has been input via an input device included in the display apparatus 110. For example, when a broadcasting signal for a soccer game is being outputted to the display apparatus 110 and it is determined that a user whose image is captured by a camera included in the display apparatus 110 is smiling, the display apparatus 110 may acquire a category corresponding to soccer as the user preference information. The display apparatus 110 may determine the facial expression of the user via image recognition with respect to the image captured by the camera. As another example, when a broadcasting signal for a soccer game is being outputted to the display apparatus 110 and a laughing sound is included in audio information acquired by a microphone included in the display apparatus 110, the display apparatus 110 may acquire a category corresponding to soccer as the user preference information.

According to an embodiment, in operation S620, the display apparatus 110 may acquire a keyword via image recognition with respect to video data included in the broadcasting signal or speech recognition with respect to audio data included in the broadcasting signal.

According to another embodiment, in operation S620, the display apparatus 110 may acquire a keyword from metadata included in the broadcasting signal. The metadata may include an EPG or other information that a content provider includes in the broadcasting signal.

According to an embodiment, in operation S630, the display apparatus 110 may include pieces of information, collected via web crawling, into an index of a search target.

In some cases, operation S630 may be divided into an operation of acquiring a search result corresponding to the acquired keyword and an operation of producing additional information based on the search result and the user preference information.

According to an embodiment, in operation S640, the display apparatus 110 may search for additional information corresponding to the user preference information from the pieces of additional information produced in operation S630. The display apparatus 110 may search for a web document (a web page) corresponding to the user preference information from a plurality of web documents (web pages) collected in operation S630. Thereafter, the display apparatus 110 may provide additional information found based on the search to the mobile terminal 100.

According to another embodiment, in operation S640, the display apparatus 110 may match keywords with the user preference information and search for additional information from among the produced pieces of additional information according to a result of the matching. The display apparatus 110 may transmit a result of the search performed by using the result of the matching to the mobile terminal 100.

Figure 7:
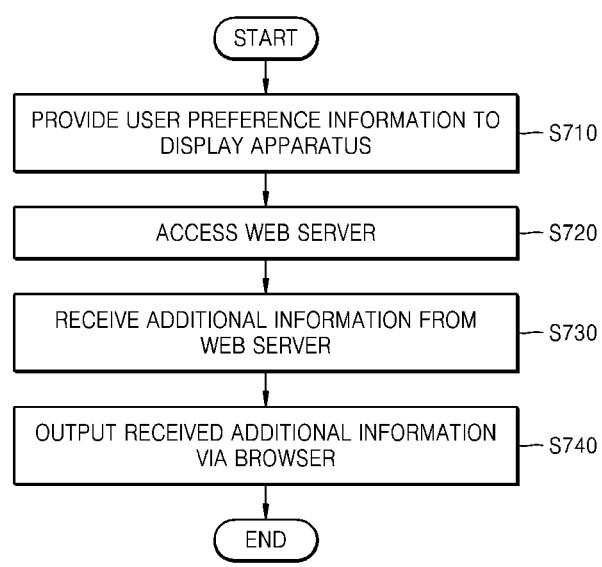
FIG. 7 is a flow chart of a process in which a mobile terminal outputs additional information according to an embodiment of the present disclosure.

FIG. 7 is a flow chart of a process in which a mobile terminal outputs additional information according to an embodiment of the present disclosure.

Referring to FIG. 7, according to an embodiment, first, the mobile terminal 100 may provide user preference information corresponding to the mobile terminal 100 to a display apparatus 110, in operation S710. Thereafter, the mobile terminal 100 may access the web server 330 included in the display apparatus 110, in operation S720. In operation S720, the mobile terminal 100 may access the web server 330 via a browser installed in the mobile terminal 100. Thereafter, in operation S730, the mobile terminal 100 may receive, from the web server 330, additional information that has been selected based on the user preference information from among pieces of additional information produced based on a broadcasting signal that is being outputted to the display apparatus 110. Then, the mobile terminal 100 may output the received additional information via the browser installed in the mobile terminal 100, in operation S740.

FIGS. 8 through 12 are conceptual diagrams illustrating an embodiment in which a display apparatus provides additional information via mobile terminals according to an embodiment of the present disclosure.

Figure 8:
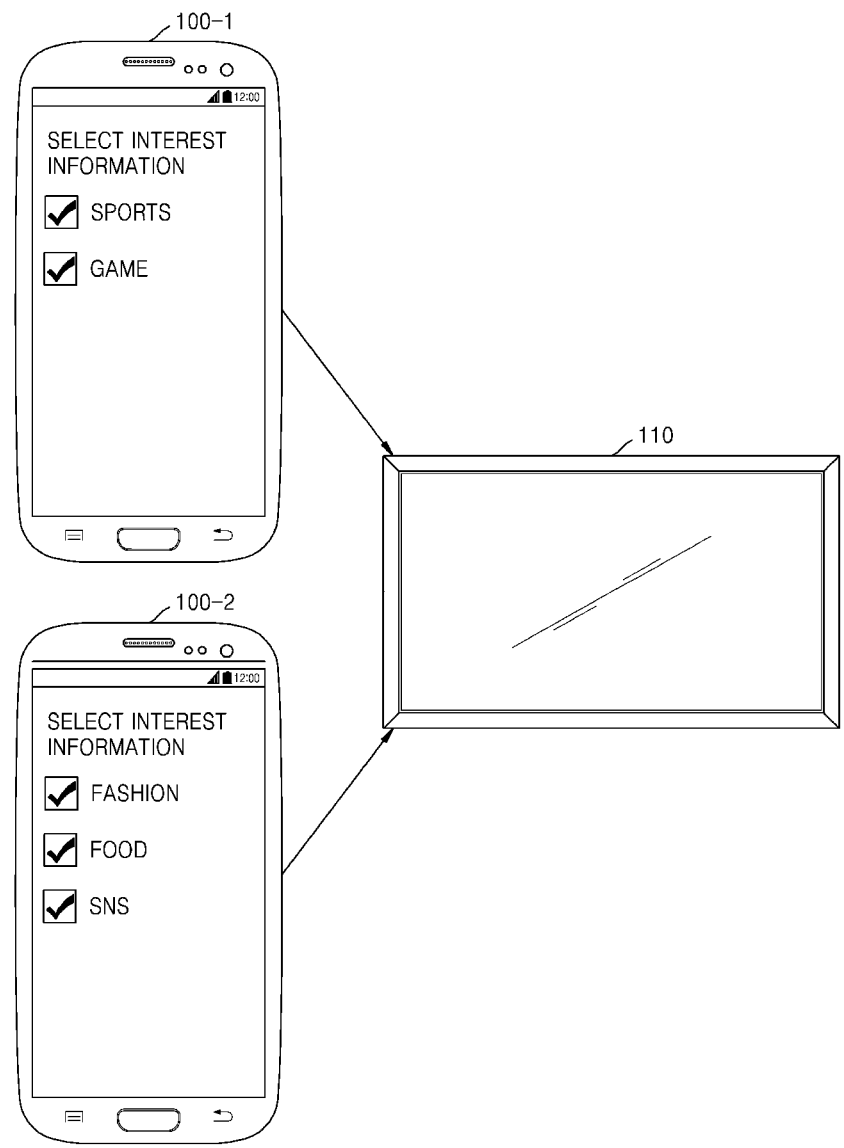
FIGS. 8 and 9 are conceptual diagrams illustrating an example in which a display apparatus acquires user preference information according to an embodiment of the present disclosure.
Figure 9:
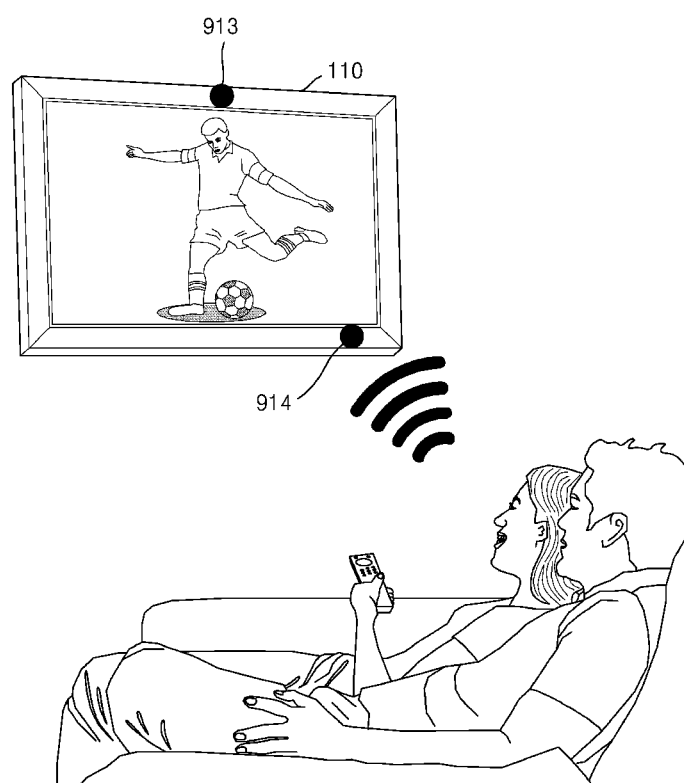

In particular, FIGS. 8 and 9 illustrate an example in which the display apparatus 110 acquires user preference information.

Referring to FIG. 8, a user may select his or her preferred categories by using mobile terminals 100-1 and 100-2. The user may select the preferred categories from lists output by the mobile terminals 100-1 and 100-2 or may input text corresponding to the preferred categories. The display apparatus 110 may acquire pieces of user preference information by receiving information about the preferred categories that the user has selected from the mobile terminals 100-1 and 100-2. The display apparatus 110 may match the pieces of user preference information acquired according to the preferred categories respectively received from the mobile terminals 100-1 and 100-2 with the mobile terminals 100-1 and 100-2, respectively, and may store the matched pieces of user preference information.

Although user preference information is inputted via the mobile terminals 100-1 and 100-2, user preference information may be input to the display apparatus 110 via a remote controller or another input device.

Referring to FIG. 9, the display apparatus 110 may acquire user preference information, based on a result of image recognition with respect to an image captured by a camera 913 included in the display apparatus 110. Alternatively, the display apparatus 110 may acquire user preference information, based on a result of voice recognition with respect to audio information acquired by a microphone 914 included in the display apparatus 110. For example, when it is determined from image recognition that a user is smiling while watching a soccer game that is being played back by the display apparatus 110, the display apparatus 110 may acquire user preference information for a category to which soccer belongs.

Figure 10:
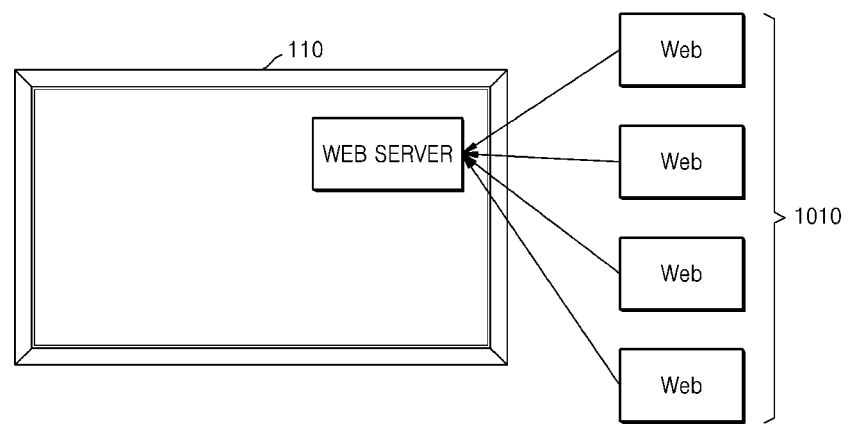
FIG. 10 is a conceptual diagram illustrating an example in which a display apparatus performs a search to produce additional information according to an embodiment of the present disclosure.

FIG. 10 is a conceptual diagram illustrating an example in which a display apparatus performs a search to produce additional information.

Referring to FIG. 10, the web server 330 included in the display apparatus 110 may collect web documents 1010 by performing an Internet search using a keyword acquired by a control unit 320 of the display apparatus 110. When the request for the additional information is received from the mobile terminals 100-1 and 100-2, the web server 330 may include the collected web documents 1010 into an index of search targets to search for additional information for a broadcasting signal according to user preference information.

Figure 11:
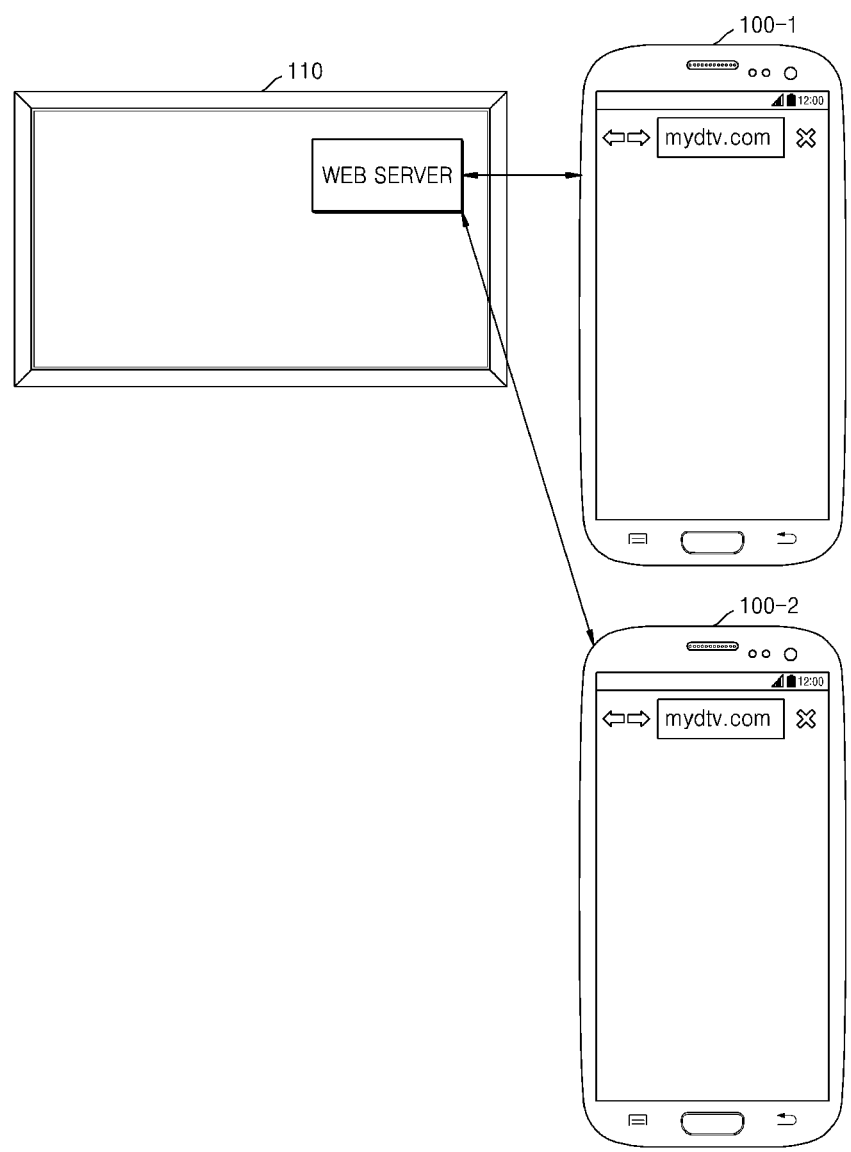
FIG. 11 is a conceptual diagram illustrating an example in which mobile terminals access a web server of a display apparatus according to an embodiment of the present disclosure.

FIG. 11 is a conceptual diagram illustrating an example in which mobile terminals access the web server of a display apparatus according to an embodiment of the present disclosure.

Referring to FIG. 11, when an address (i.e., mydtv.com) corresponding to the web server 330 of the display apparatus 110 is inputted to browsers included in the mobile terminals 100-1 and 100-2, the mobile terminals 100-1 and 100-2 may access the web server 330 of the display apparatus 110. The mobile terminals 100-1 and 100-2 connected to the web server 330 may request additional information for a broadcasting signal being outputted by the display apparatus 110, together with respective pieces of identification information of the mobile terminals 100-1 and 100-2.

Figure 12:
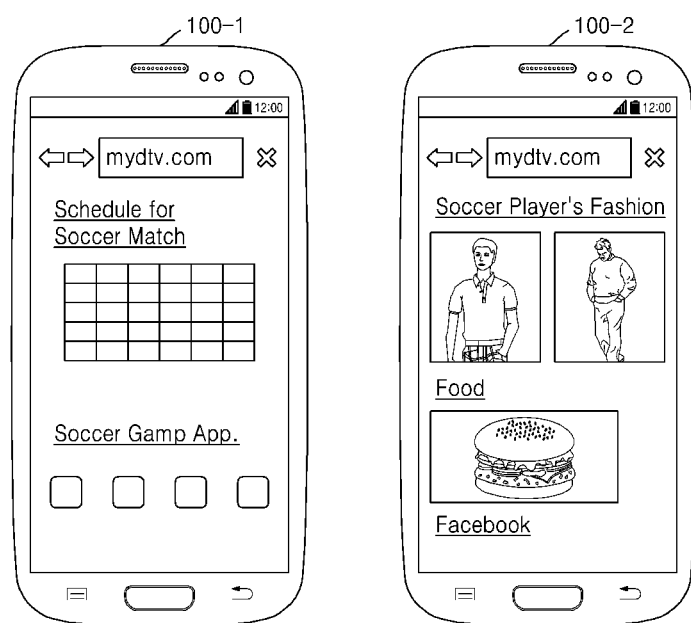
FIG. 12 is a conceptual diagram illustrating an example in which mobile terminals output additional information for a broadcasting signal according to an embodiment of the present disclosure.

FIG. 12 is a conceptual diagram illustrating an example in which mobile terminals output additional information for a broadcasting signal according to an embodiment of the present disclosure.

Referring to FIG. 12, the mobile terminal 100-1, in which sports and games have been registered as preferred categories in user preference information, may receive additional information, namely, a schedule for a soccer match and a soccer game application, from a display apparatus 110 and may display the received additional information. The mobile terminal 100-2, in which fashion, food, and a Social Network Service (SNS) have been registered as preferred categories in the user preference information, may receive a soccer player's fashion style, food recommended in relation to the soccer match, and SNS information about the soccer match from the display apparatus 110, and may display them.

As such, according to an embodiment, even when a single broadcasting signal is being reproduced by a display apparatus 110, different pieces of additional information may be provided according to different users. In other words, users may be provided with information suitable for the users.

Figure 13:
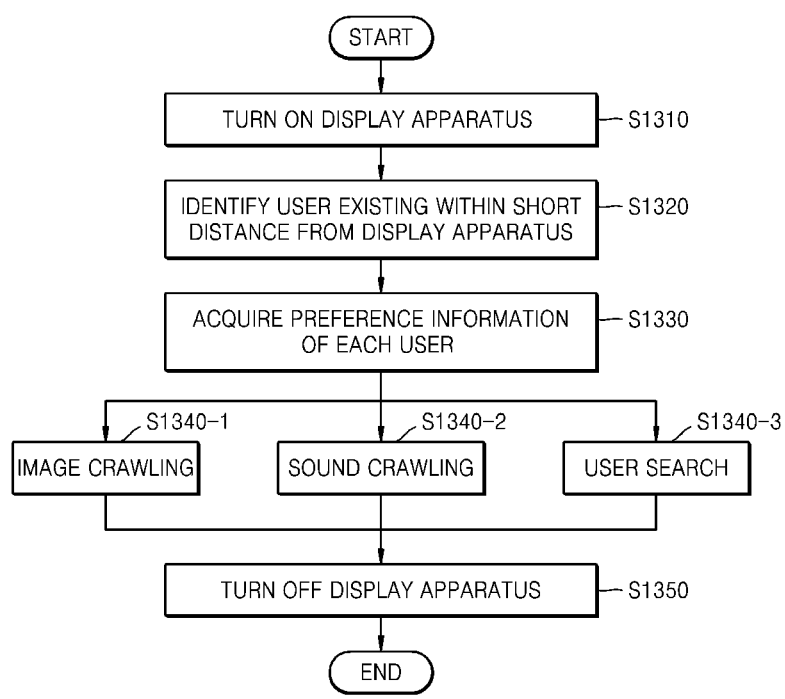
FIG. 13 is a flow chart of a process in which a display apparatus provides additional information according to an embodiment of the present disclosure.

FIG. 13 is a flow chart of a process in which a display apparatus provides additional information, according to an embodiment according to an embodiment of the present disclosure.

Referring to FIG. 13, when the display apparatus 110 is powered on in operation S1310, the display apparatus 110 identifies a user located within a short distance from the display apparatus 110, in operation S1320. According to an embodiment, the display apparatus 110 may identify the user located within a short distance from the display apparatus 110, by identifying a mobile terminal 100 logged in to the display apparatus 110 via short-distance wireless communication with the display apparatus 110. The short-distance wireless communication is wireless communication performed within several tens of meters, performed by a wireless protocol such as, Wi-Fi, Bluetooth, Zigbee, or Near Field Communication (NFC). However, embodiments of the present disclosure are not limited thereto.

Then, the display apparatus 110 may acquire preference information of each user who has been identified in operation S1320, in operation S1330. According to an embodiment, the display apparatus 110 may acquire the preference information from database existing inside or outside the display apparatus 110. According to another embodiment, the display apparatus 110 may receive preference information directly input by a user via an input device included therein, or receive preference information from the mobile terminal 100. The input device is a device via which information may be input, such as, a mouse, a remote controller, and/or a keyboard.

Then, the display apparatus 110 may produce additional information by image crawling S1340-1, sound crawling S1340-2, and/or a user search S1340-3 and provide the produced additional information to the user. The image crawling S1340-1, the sound crawling S1340-2, and the user search S1340-3 will be described later in greater detail with reference to FIGS. 14 through 16.

When the mobile terminal 100 logged in to the display apparatus 110 is added, the display apparatus 110 may repeatedly perform operations S1320 through S1340-3. When the display apparatus 110 is turned off in operation S1350, the display apparatus 110 concludes the process.

Figure 14:
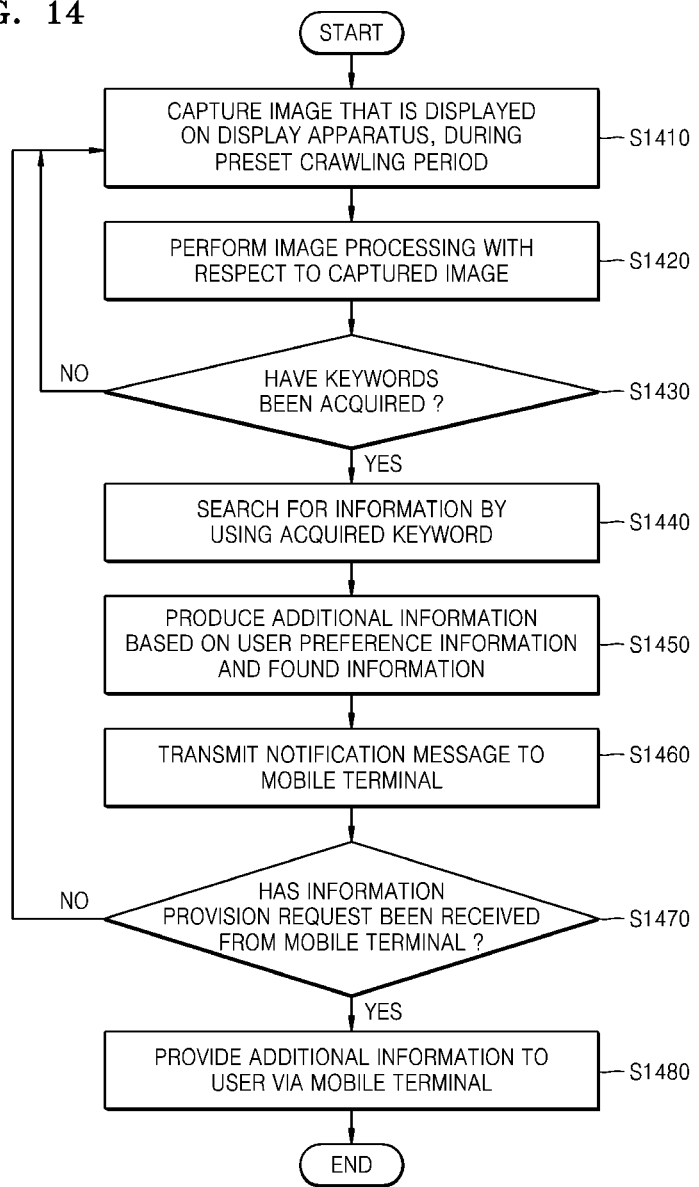
FIG. 14 is a flow chart of a process in which a display apparatus provides additional information via image crawling according to an embodiment of the present disclosure.

FIG. 14 is a flow chart of a process in which a display apparatus provides additional information via image crawling according to an embodiment of the present disclosure.

Referring to FIG. 14, the control unit 320 included in the display apparatus 110 may capture an image that is displayed on the display apparatus 110, during a preset crawling period, in operation S1410. Then, the control unit 320 may perform image processing with respect to the captured image, in operation S1420. The image processing may be image recognition with respect to an object included in an image. For example, when a face of a person is included in the image, the control unit 320 may recognize that the face of the person is included in the image, based on a result of a comparison between the face included in the image and information stored in image recognition database.

Then, the control unit 320 may acquire a keyword according to a result of the image recognition performed in operation S1420. For example, when a news image about a president is being outputted via a display unit of the display apparatus 110, the control unit 320 may acquire a keyword such as a word "president" or the name of the president. When it is determined in operation S1430 that no keywords have been acquired, the control unit 320 may re-perform operation S1410. On the other hand, when it is determined in operation S1430 that a keyword has been acquired, a web server 330 included in the display apparatus 110 or the control unit 320 may search for information by using the acquired keyword, in operation S1440. According to an embodiment, in operation S1440, the web server 330 or the control unit 320 may search for a web document by using a web search engine. However, the search in operation S1440 is not limited to searching for a web document. According to another embodiment, the control unit may acquire a keyword from broadcasting-related information such as an EPG. For example, a word included in a broadcasting program title included in the EPG may be acquired as a keyword.

Thereafter, the web server 330 or the control unit 320 may produce additional information that is to be provided to a user, based on user preference information and the information found in operation S1440, in operation S1450. The user preference information may be information acquired from database that stores the user preference information, or information directly input by a user.

According to an embodiment, as the additional information is produced in operation S1450, the control unit 320 may control a communication unit to transmit a notification message indicating that the additional information has been produced, to the mobile terminal 100, in operation S1460. According to another embodiment, as the additional information is produced in operation S1450, the control unit may control the display unit to display a notification message indicating that the additional information has been produced, on the screen of the display apparatus 110 via which a broadcasting signal is being outputted, in operation S1460.

Then, when the control unit 320 receives an information provision request from the mobile terminal 100 via the communication unit in operation S1470, the control unit 320 may provide the additional information to the user via the mobile terminal 100, in operation S1480. In other words, the additional information may be transmitted to the mobile terminal 100. The mobile terminal 100 that has received the additional information may output the received additional information. According to an embodiment, when the additional information provided to the user in operation S1480 is selected by the user, the control unit 320 may update the database that stores the user preference information. For example, a total number of accesses, namely, a total number of times the user has accessed the additional information, as shown in FIG. 20, may be updated. On the other hand, when no information provision requests are received from the mobile terminal 100 in operation S1470, the control unit 320 may re-perform operation S1410.

Figure 15:
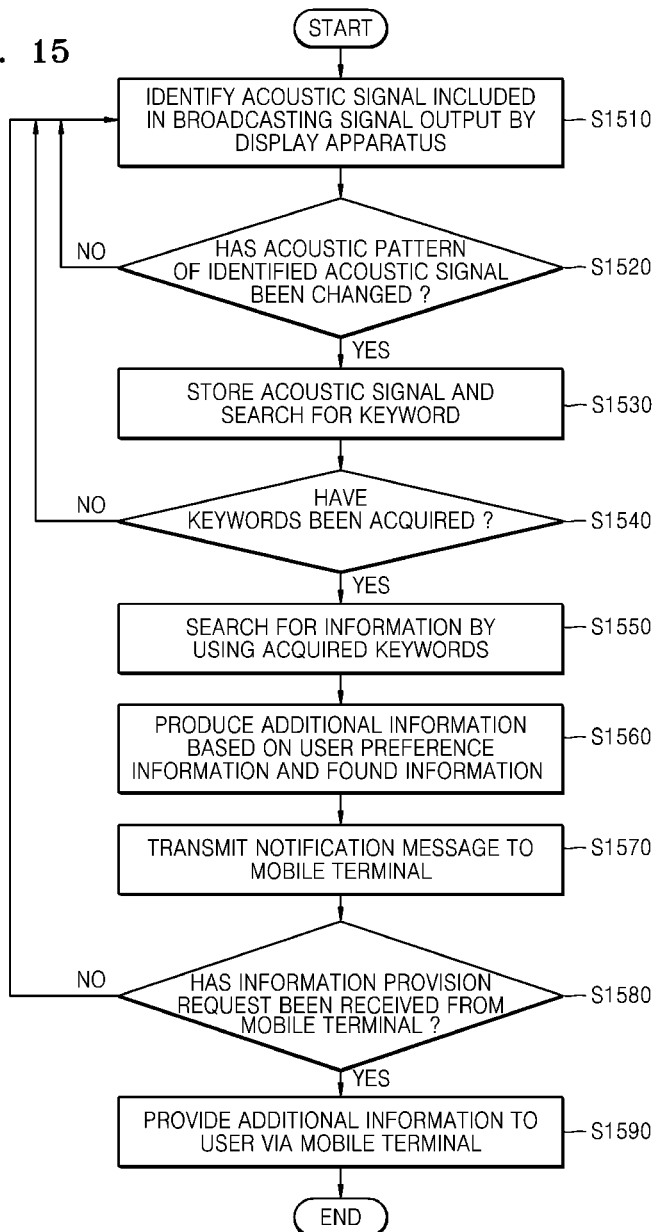
FIG. 15 is a flow chart of a process in which a display apparatus provides additional information via sound crawling according to an embodiment of the present disclosure.

FIG. 15 is a flow chart of a process in which the display apparatus provides additional information via sound crawling according to an embodiment of the present disclosure.

Referring to FIG. 15, the control unit 320 included in the display apparatus 110 may identify an acoustic signal included in a broadcasting signal output by the display apparatus 110, in operation S1510. The control unit 320 may determine whether the acoustic pattern of the identified acoustic signal has changed, in operation S1520. For example, when a conversation between people being outputted in a broadcasting program played back by the display apparatus 110 is replaced by a song included in an Original Sound Track (OST) of the broadcasting program, the control unit 320 may determine that the acoustic pattern of the acoustic signal has changed. The determination as to whether the acoustic pattern of the acoustic signal has changed may be made by various methods. For example, the control unit 320 may compare the acoustic pattern of the broadcasting signal with acoustic patterns stored in a database. The control unit 320 may determine whether an acoustic pattern matched with the acoustic pattern of the broadcasting signal from among the acoustic patterns stored in the database has changed. When the acoustic pattern matched with the acoustic pattern of the broadcasting signal from among the acoustic patterns stored in the database has changed, the control unit 320 may determine that the acoustic pattern of the broadcasting signal has changed. When it is determined in operation S1520 that the acoustic pattern has not changed, the control unit 320 may re-perform operation S1510.

Then, when it is determined in operation S1520 that the acoustic pattern has changed, the control unit 320 may store the acoustic signal and search for a keyword that is matched with the acoustic signal, in operation S1530. For example, when a sportscaster or sports commentator of a broadcasting program being outputted by the TV says "Hyunjin Ryu opens the today's baseball match.", a control unit 320 included in the TV may acquire a baseball and Hyunjin Rye as keywords. As another example, when a song included in an OST is played back in the broadcasting program being outputted by the TV, the control unit 320 included in the TV may acquire the title of the OST and the name of an artist of the OST as keywords. When it is determined in operation S1540 that no keywords have been acquired, the control unit 320 may re-perform operation S1510.

When it is determined in operation S1540 that keywords have been acquired, the web server 330 or the control unit 320 may search for information by using the acquired keywords, in operation S1550. According to an embodiment, in operation S1550, the web server 330 or the control unit 320 may search for web documents by using an external web search engine. However, embodiments of the present disclosure are not limited thereto, and the control unit 320 or the web server 330 may search for information other than a web document, in operation S1550.

Thereafter, the web server 330 or the control unit 320 may produce additional information that is to be provided to a user, based on user preference information and the information found in operation S1550, in operation S1560. The user preference information may be information acquired from database that stores the user preference information, or information directly input by a user.

According to an embodiment, as the additional information is produced in operation S1560, the control unit 320 may control a communication unit to transmit a notification message indicating that the additional information has been produced, to the mobile terminal 100, in operation S1570. According to another embodiment, as the additional information is produced in operation S1560, the control unit 320 may control the display unit to display the notification message indicating that the additional information has been produced, on the screen of the display apparatus 110 via which a broadcasting signal is being outputted, in operation S1570.

Then, when the control unit 320 receives an information provision request from the mobile terminal 100 via the communication unit in operation S1580, the control unit 320 may provide the additional information to the user via the mobile terminal 100, in operation S1590. In other words, the additional information may be transmitted to the mobile terminal 100. The mobile terminal 100 that has received the additional information may display the received additional information. According to an embodiment, when the additional information provided to the mobile terminal 100 in operation S1590 is selected by the user, the control unit 320 may update the database that stores the user preference information. In other words, the control unit 320 may update the user preference information by receiving an ID of the selected additional information from the mobile terminal 100. For example, a total number of accesses shown in FIG. 20 may be updated. On the other hand, when no information provision requests have been received from the mobile terminal 100 in operation S1580, the control unit 320 may re-perform operation S1510.

Figure 16:
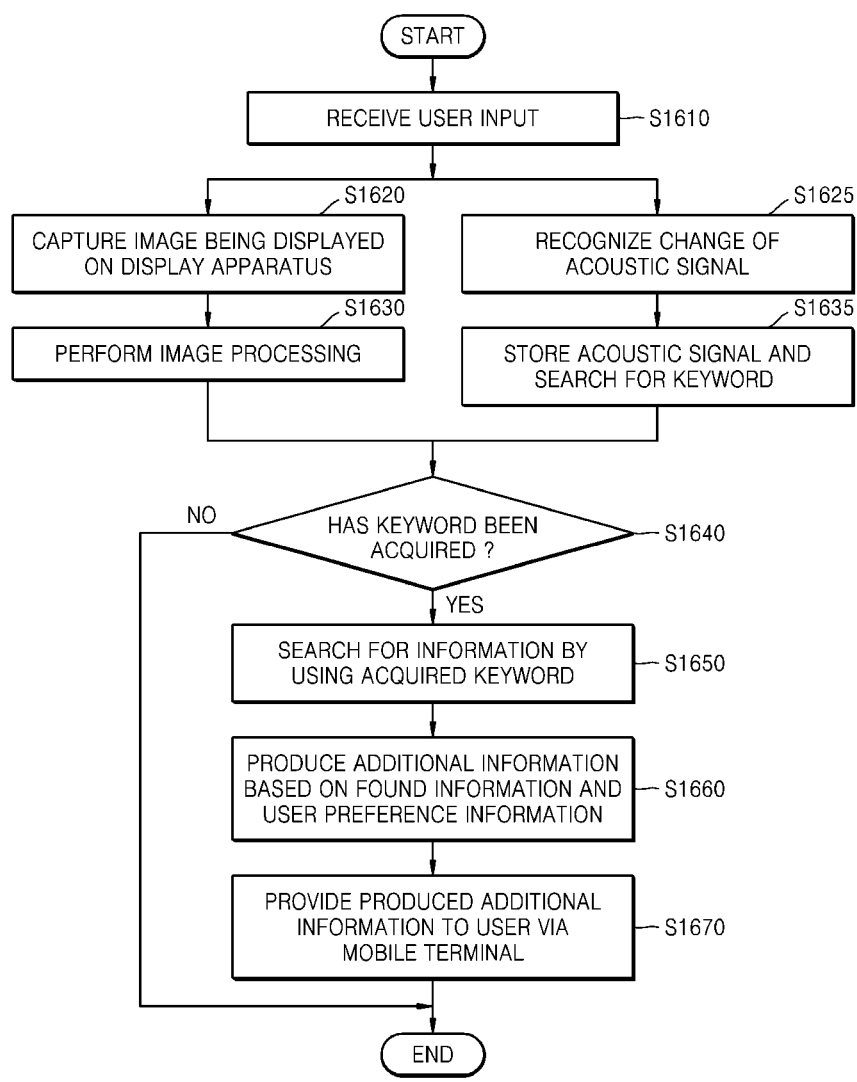
FIG. 16 is a flow chart of a process in which a display apparatus provides additional information via a user search according to an embodiment of the present disclosure.

FIG. 16 is a flow chart of a process in which the display apparatus 110 provides additional information via a user search according to an embodiment of the present disclosure.

Referring to FIG. 16, the display apparatus 110 may receive a user input including a command requesting for additional information, in operation S1610. The user input may be embodied in various forms according to embodiments. For example, as a specific button included in a remote controller is pressed, a user takes a preset gesture in front of the display apparatus 110, or a preset sound is inputted, the display apparatus 110 may receive a user input including a command requesting for additional information.

Thereafter, a control unit 320 included in the display apparatus 110 may capture an image being displayed on the display apparatus 110 in operation S1620, and may perform image processing with respect to the captured image in operation S1630. Operations S1620 and S1630 correspond to operations S1410 and S1420 of FIG. 14, and thus a detailed description thereof will be omitted. The control unit 320 may recognize a change in an acoustic signal included in a broadcasting signal being reproduced by the display apparatus 110, in operation S1625. Once the change of the acoustic signal is recognized, the control unit 320 may store the acoustic signal and search for a keyword corresponding to the acoustic signal, in operation S1635. Operations S1625 and S1635 correspond to operations S1510 through S1530 of FIG. 15, and thus a detailed description thereof will be omitted.

If it is determined in operation S1640 that a keyword has been acquired as a result of operations S1630 and S1635, the control unit 320 may search for information by using the acquired keyword, in operation S1650. Then, the control unit 320 may produce additional information based on found information and user preference information, in operation S1660. Thereafter, the control unit 320 may provide the produced additional information to a user via the mobile terminal 100, in operation S1670. Since operations S1650 and S1670 may be easily understood by one of ordinary skill in the art with reference to FIGS. 14 and 15, a detailed description thereof will be omitted.

FIG. 17 is a table showing information about keywords stored in a display apparatus according to an embodiment of the present disclosure.

Referring to FIG. 17, the display apparatus 110 according to an embodiment may acquire keywords from a broadcasting signal and store the acquired keywords. The display apparatus 110 may store search IDs of the acquired keywords, types, data, search time, and the acquired keywords. However, embodiments of the present disclosure are not limited thereto. The search IDs are identification information that identifies keywords. The types are keyword types. For example, the types may be information indicating whether a keyword has been acquired via image crawling, sound crawling, or a user search. The data is information indicating which data a keyword has been acquired from. For example, the data may be information indicating whether a keyword has been acquired from image data, from metadata such as an EPG, or from sound data. The search time may be a period of time taken to acquire a keyword or to search for information using the keyword.

FIG. 18 is a table showing information included in a search result according to an embodiment of the present disclosure.

Referring to FIG. 1, a display apparatus 110 may acquire and store information as illustrated in FIG. 18, as a result of operation S1440 of FIG. 14, operation S1550 of FIG. 15, or operation S1650 of FIG. 16. The display apparatus 110 may store, as information acquired using a keyword acquired from a broadcasting signal, a search result ID, a search ID, a group to which found information belongs, the title of the found information, contents included in the found information, and link information.

The search result ID is identification information assigned to identify found information. The search ID is identification information assigned to identify a keyword used in a search. The group to which found information belongs indicates a type by which the found information is classified. For example, the group may be detailed information about a broadcast program, news associated with the broadcast program, and a web document associated with the broadcast program. The title of the found information may be the title of a found web document. The title may be information included in the metadata of a web document. The contents included in the found information may be information associated with a keyword from among pieces of information included in a found web document. The link information may denote location information for accessing the found web document.

FIG. 19 is a table showing additional information produced according to an embodiment of the present disclosure.

FIG. 20 is a table showing user preference information according to an embodiment of the present disclosure.

Referring to FIGS. 19 and 20, in operation S1450 of FIG. 14, operation S1560 of FIG. 15, and operation S1660 of FIG. 16, the display apparatus 110 may acquire the user preference information illustrated in FIG. 20 and produce the additional information illustrated in FIG. 19 based on the user preference information and a keyword acquired from a broadcasting signal.

According to an embodiment, the user preference information may include a user ID, a preference rank, a final-access time when additional information was last accessed, the total number of accesses, a category, and a plurality of keywords. The user ID is identification information assigned to identify the user of a mobile terminal 100. The preference rank is the ranking of each keyword category according to user preference. The preference rank may increase as the final access time is within a preset range from a current point in time and the total number of accesses increases. However, embodiments of the present disclosure are not limited thereto. The total number of accesses is the number of times a user has accessed additional information found via keywords belonging to a certain category. For example, when a user 1 accesses a web page corresponding to a game category by selecting information found via keywords belonging to the game category from among pieces of information provided to the mobile terminal 100 of the user 1, the total number of accesses corresponding to the game category may increase. The category is an upper concept to a keyword. In other words, a plurality of keywords belong to a category. The plurality of keywords include keywords preferred by a user.

According to an embodiment, the display apparatus 110 may acquire first additional information by using keywords acquired from a broadcasting signal. The display apparatus 110 may also acquire second additional information by performing a search with respect to the first additional information by using keywords included in user preference information. The display apparatus 110 may allow some of the first additional information and the second additional information to be displayed on the display apparatus 110 or the mobile terminal 100. For example, the top 10 pieces of additional information in terms of preference rank from among the first additional information, and the top 5 pieces of additional information in terms of preference rank from among the second additional information may be displayed on the display apparatus 110 or the mobile terminal 100. The preference rank of additional information may be determined based on the preference ranks included in the user preference information. For example, additional information corresponding to additional information ID of id R001 of FIG. 19 may be acquired by searching again for additional information with respect to the found information shown in FIG. 18 by using keywords "game" and "baseball" included in the preference information of the user 1.

According to another embodiment, the display apparatus 110 may compare the keywords acquired from the broadcasting signal with the keywords included in the user preference information. The display apparatus 110 may search for information by using matching keywords as determined by the comparison. For example, when a keyword acquired from the broadcasting signal is the name of a baseball player and keywords included in the user preference information are fashion and bracelet, the display apparatus 110 may acquire additional information by searching for information about the fashion and bracelet of the baseball player.

Additional information acquired according to an embodiment may be stored and managed in a form as illustrated in FIG. 19. The additional information stored inside or outside the display apparatus 110 may include an additional information ID, a search ID, a search result ID, a user ID, a user preference, a title, contents, and link information. However, embodiments of the present disclosure are not limited thereto. The additional information ID is identification information assigned to identify additional information. The search result ID is identification information for identifying information acquired as a result of operation S1440 of FIG. 14, operation S1550 of FIG. 15, or operation S1650 of FIG. 16 performed by the display apparatus 110. The user ID is identification information for identifying the user of a mobile terminal 100 which is to receive the additional information. In other words, the user ID may be used to identify the mobile terminal 100. The user preference denotes information for distinguishing which category in the user preference information the additional information corresponds to. The title is the title of a web document including the additional information. The contents may be contents associated with a keyword within the additional information. The link information may be location information for accessing a web document corresponding to the additional information.

FIG. 21 is a table showing keywords classified by categories according to an embodiment of the present disclosure.

Referring to FIG. 21, a display apparatus 110 may classify a plurality of keywords by categories, assign a category ID to each category, and manage the categories according to the category IDs.

Figure 22:
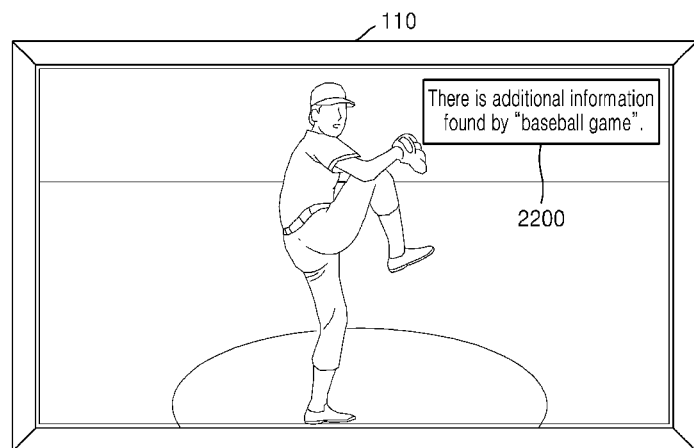
FIG. 22 is a schematic diagram illustrating outputting of a notification message for additional information to a display apparatus according to an embodiment of the present disclosure.

FIG. 22 is a schematic diagram illustrating an embodiment in which a notification message associated with additional information is output to the display apparatus 110 according to an embodiment of the present disclosure.

Referring to FIG. 22, when the display apparatus 110 has produced the additional information, the display apparatus 110 may output a notification message 2200 indicating that there is additional information. The notification message 2200 may include a variety of information associated with the additional information. For example, the notification message 2200 may include information such as the number of found pieces of additional information and information about a category associated with the additional information. The information included in the notification message 2200 may vary according to embodiments.

Figure 23:
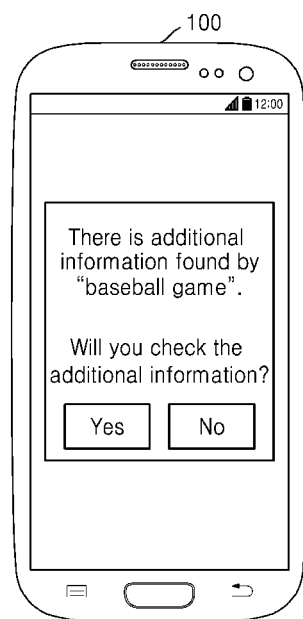
FIG. 23 is a schematic diagram illustrating outputting of a notification message for additional information to a mobile terminal according to an embodiment of the present disclosure.

FIG. 23 is a schematic diagram illustrating an embodiment in which a notification message for additional information is output to a mobile terminal according to an embodiment of the present disclosure.

Referring to FIG. 23, when the display apparatus 110 has produced the additional information, the display apparatus 110 may transmit a notification message to the mobile terminal 100. The mobile terminal 100 that has received the notification message may output the received informing message. The notification message may include a variety of information associated with the additional information. For example, the notification message may include information such as the number of found pieces of additional information and a category associated with the additional information. The information included in the notification message may vary according to embodiments.

The mobile terminal 100 may receive the additional information together with the notification message and output a UI for determining whether to display the additional information on the mobile terminal 100.

Figure 24:
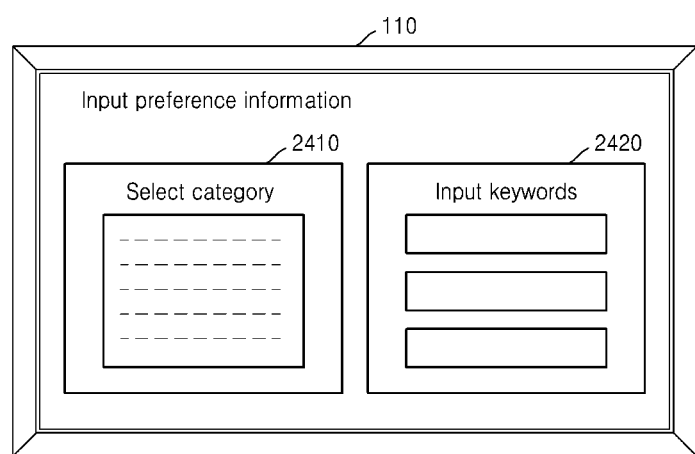
FIG. 24 is a schematic diagram illustrating an example of a user interface (UI) via which a user inputs user preference information according to an embodiment of the present disclosure.

FIG. 24 is a schematic diagram illustrating an example of a UI allowing a user to input user preference information according to an embodiment of the present disclosure.

Referring to FIG. 24, the display apparatus 110 may output a UI allowing a user to input preference information. As illustrated in FIG. 24, the display apparatus 110 may output a UI 2410 for selecting a category included in the preference information and a UI 2420 for inputting keywords. However, embodiments of the present disclosure are not limited thereto.

According to another embodiment, the display apparatus 110 may acquire user preference information by receiving user preference information input to a mobile terminal 100, without receiving a user input via a UI output on the display apparatus 110.

According to another embodiment, the display apparatus 110 may receive user preference information corresponding to each user from a cloud server.

According to an embodiment, the display apparatus 110 may acquire user preference information from a variety of information, such as, user's emotion information acquired from an image of a user captured by a camera included in the display apparatus 110, a history of a broadcast program output via the display apparatus 110, schedule information stored in a mobile terminal 100, and search keywords input by the user.

The embodiment of the present disclosure can be embodied in a storage medium including instruction codes executable by a computer such as a program module executed by the computer. A computer readable medium may be any usable medium which may be accessed by the computer and includes all volatile media, such as RAM, non-volatile media, such as ROM, removable media, and non-removable media. Further, the computer readable medium may include all computer storage. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, or the program module. For example, the computer storage medium may be ROM, RAM, flash memory, a compact disk (CD), a digital versatile disk (DVD), or the like. A computer-readable recording medium according to an embodiment of the present disclosure may have embodied thereon a computer program for a process in which a display apparatus 110 performs an operation of acquiring user preference information corresponding to a mobile terminal 100, an operation of acquiring a keyword from a broadcasting signal being reproduced by the display apparatus 110, an operation of collecting documents by using the acquired keyword and producing pieces of additional information based on the collected documents, by using a web server 330 included in the display apparatus 110, and an operation of providing the mobile terminal 100 with additional information selected according to the user preference information from among the produced pieces of additional information. A computer-readable recording medium according to another embodiment of the present disclosure may have embodied thereon a program for a process in which a mobile terminal 100 performs an operation of providing user preference information to a display apparatus 110, an operation of accessing a web server 330 included in the display apparatus 110, an operation of receiving, from the web server 330, additional information that has been selected based on the user preference information from among pieces of additional information produced based on a broadcasting signal that is being outputted to the display apparatus 110, and an operation of outputting the received additional information via a browser included in the mobile terminal 100.

Although the embodiments of the present disclosure have been disclosed for illustrative purposes, one of ordinary skill in the art will appreciate that diverse variations and modifications are possible, without departing from the spirit and scope of the disclosure. Thus, the above embodiments should be understood not to be restrictive but to be illustrative, in all aspects. For example, respective elements described in an integrated form may be dividedly used, and the divided elements may be used in a state of being combined.

The embodiments should be considered in descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of providing additional information associated with content, performed by a display apparatus, the method comprising:
   establishing a connection with a mobile terminal;
   receiving a request for additional information associated with the content being reproduced by the display apparatus from the mobile terminal;
   receiving user preference information from the mobile terminal;
   acquiring a keyword from the content being reproduced by the display apparatus;
   collecting a plurality of web pages corresponding to the acquired keyword by performing an internet search;
   producing the additional information associated with the content based on the received user preference information from among information included in the collected plurality of web pages;
   producing a web page including the additional information associated with the content by:
      combining the acquired keyword and the received user preference information with each other; and
      producing the additional information based on the plurality of web pages and a result of the combination of the acquired keyword and the received user preference information;
   transmitting the produced web page to the mobile terminal;
   receiving user feedback information regarding the additional information transmitted to the mobile terminal, from the mobile terminal; and
   updating the received user preference information based on the received user feedback information,
   wherein the updated user preference information is stored in a memory included in the display apparatus.

2. The method of claim 1, wherein the producing of the web page including the additional information comprises producing, as the additional information, a search result corresponding to both the acquired keyword and the received user preference information.

3. The method of claim 1, wherein the acquiring of the keyword comprises recognizing image information or audio information included in the content and received the keyword from a result of the recognition.

4. The method of claim 1, wherein the acquiring of the user preference information corresponding to the mobile terminal comprises receiving schedule information input to the mobile terminal, from the mobile terminal.

5. The method of claim 1, wherein the acquiring of the user preference information corresponding to the mobile terminal comprises acquiring search keyword information input to a web browser of the mobile terminal, from the mobile terminal.

6. The method of claim 1, wherein the acquiring of the user preference information corresponding to the mobile terminal comprises acquiring the user preference information based on information acquired by at least one selected from a camera and a microphone that are included in the display apparatus.

7. The method of claim 1, wherein the acquiring of the user preference information corresponding to the mobile terminal comprises receiving the user preference information corresponding to the mobile terminal from an external server.

8. A method of outputting additional information associated with content, performed by a mobile terminal, the method comprising:
   establishing a connection with a display apparatus;
   transmitting a request for additional information associated with the content being reproduced by the display apparatus to the display apparatus;
   transmitting user preference information to the display apparatus;
   receiving a user input for accessing a web server included in the display apparatus, by using a web browser installed in the mobile terminal;
   receiving, from the display apparatus, a web page including additional information associated with the content; and
   outputting the received web page including the additional information,
   wherein the web page includes the additional information being produced based on the transmitted user preference information from among information included in a plurality of web pages corresponding to a keyword acquired from the content being reproduced by the display apparatus,
   wherein the user preference information is updated based on received user feedback information, and wherein the web page is produced including the additional information by:
   combining the acquired keyword and the acquired received user preference information with each other; and
   producing the additional information based on the plurality of web pages and a result of the combination of the acquired keyword and the acquired received user preference information.

9. A display apparatus comprising:
a communication interface configured to establish a connection with a mobile terminal; and
at least one processor configured to:
   receive a request for additional information associated with content being reproduced by the display apparatus from the mobile terminal via the communication interface;
   acquire a keyword from the content being reproduced by the display apparatus,
   receive user preference information from the mobile terminal via the communication interface,
   collect a plurality of web pages corresponding to the acquired keyword by performing an internet search,
   produce the additional information associated with the content based on the received user preference information from among information included in the collected plurality of web pages;
   produce a web page including the additional information associated with the content,
   transmit the produced web page to the mobile terminal via the communication interface,
   receive user feedback information regarding the additional information transmitted to the mobile terminal, from the mobile terminal via the communication interface,
   acquire the user preference information from a memory of the display apparatus, and
   update the received user preference information stored in the memory based on the received user feedback information,
wherein the at least one processor is further configured, when producing the web page, to:
   combine the acquired keyword and the received user preference information with each other, and
   produce the additional information based on the plurality of web pages and a result of the combination of the acquired keyword and the received user preference information.

10. The display apparatus of claim 9, wherein the at least one processor is further configured to produce, as the additional information, a search result corresponding to both the acquired keyword and the received user preference information.

11. The display apparatus of claim 9, wherein the at least one processor is further configured to recognize image information or audio information included in the content and to acquire the acquired keyword from a result of the recognition.

12. The display apparatus of claim 9, wherein the at least one processor is further configured to:

receive schedule information input to the mobile terminal from the mobile terminal via the communication interface, and
acquire the user preference information based on the received schedule information.

13. The display apparatus of claim 9,
wherein the communication interface is further configured to receive a history of search keyword information input to a web browser of the mobile terminal, from the mobile terminal, and
wherein the at least one processor is further configured to acquire the user preference information based on the received history of the search keyword information.

14. The display apparatus of claim 9, wherein the at least one processor is further configured to acquire the user preference information based on information acquired by at least one selected from a camera and a microphone that are included in the display apparatus.

15. The display apparatus of claim 9, wherein the at least one processor is further configured to acquire user preference information corresponding to the mobile terminal from an external server via the communication interface.

16. A mobile terminal comprising:
a communication interface configured to:
   establish a connection with a display apparatus,
a display configured to output an image; and
at least one processor configured to:
   transmit a request for additional information associated with content being reproduced by the display apparatus to the display apparatus via the communication interface;
   transmit user preference information to the display apparatus via the communication interface;
   receive a user input for accessing a web server included in the display apparatus, by using a web browser installed in the mobile terminal;
   receive, from the display apparatus, a web page including additional information associated with the content; and
   control the display to output the received web page including the additional information,
wherein the web page includes the additional information being produced based on the transmitted user preference information from among information included in a plurality of web pages corresponding to a keyword acquired from the content being reproduced by the display apparatus,
wherein the user preference information is updated based on received user feedback information, and
wherein the web page is produced including the additional information by:
   combining the acquired keyword and the acquired received user preference information with each other: and
   producing the additional information based on the plurality of web pages and a result of the combination of the acquired keyword and the acquired received user preference information.

* * * * *